US012774902B2

(12) United States Patent
Nemati et al.

(10) Patent No.: US 12,774,902 B2
(45) Date of Patent: Oct. 27, 2026

(54) MACHINE NAVIGATION USING MAPS

(71) Applicant: NVIDIA Corporation, Santa Clara, CA (US)

(72) Inventors: Alireza Nemati, Newcastle, WA (US); Amir Akbarzadeh, Alamo, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/770,388

(22) Filed: Jul. 11, 2024

(65) Prior Publication Data

US 2026/0016314 A1 Jan. 15, 2026

(51) Int. Cl.

*G01C 21/00* (2006.01)
*G06T 7/33* (2017.01)
*G06T 7/70* (2017.01)
*G06V 10/80* (2022.01)
*G06V 10/764* (2022.01)

(52) U.S. Cl.

CPC ...... *G01C 21/3841* (2020.08); *G01C 21/3811* (2020.08); *G06T 7/33* (2017.01); *G06T 7/70* (2017.01); *G06V 10/803* (2022.01); *G06T 2207/10028* (2013.01); *G06V 10/764* (2022.01)

(58) Field of Classification Search

CPC ... G01C 21/3841; G01C 21/3811; G06T 7/33; G06T 7/70; G06T 2207/10028; G06V 10/803; G06V 10/764

See application file for complete search history.

(56) References Cited

U.S. PATENT DOCUMENTS

| | | | | |
|---|---|---|---|---|
| 10,670,416 | B2 | 6/2020 | Wheeler et al. | |
| 10,783,393 | B2 | 9/2020 | Molchanov et al. | |
| 10,928,523 | B2 | 2/2021 | Adachi | |
| 11,365,976 | B2 | 6/2022 | Colgate et al. | |
| 11,590,989 | B2 | 2/2023 | Majithia | |
| 11,713,978 | B2 | 8/2023 | Akbarzadeh et al. | |
| 11,775,570 | B2 | 10/2023 | Wheeler | |
| 11,835,375 | B2 | 12/2023 | Schwenter et al. | |
| 11,867,515 | B2 | 1/2024 | Zeng et al. | |
| 2019/0204092 | A1 | 7/2019 | Wheeler | |
| 2021/0063199 | A1* | 3/2021 | Akbarzadeh ....... | G01C 21/3811 |
| 2021/0162994 | A1* | 6/2021 | Shalev-Shwartz .... | B60W 30/09 |

FOREIGN PATENT DOCUMENTS

| | | | |
|---|---|---|---|
| DE | 102025126650 | A1 | 1/2026 |

* cited by examiner

*Primary Examiner* — Adnan M Mirza
(74) *Attorney, Agent, or Firm* — IRON SUMMIT IP LLP

(57) ABSTRACT

In various examples, augmenting camera-based maps with sensor reflection information for autonomous and/or semi-autonomous systems and applications is described herein. Systems and methods described herein may augment map data representing a camera-based map using another type of data, such as RADAR data. For instance, image data generated using one or more machines navigating within an environment may be used to determine locations associated with landmarks (e.g., objects, features, etc.) located within an environment. The sensor data generated using the machine(s) may then be processed to determine whether the landmarks are associated with sensor reflections or whether the landmarks are not associated with sensor reflections. Additionally, the camera-based map may then be updated to include at least the locations associated with the landmarks and indications of whether the landmarks that are associated with sensor reflections.

20 Claims, 20 Drawing Sheets

MACHINE NAVIGATION USING MAPS

BACKGROUND

For an autonomous and/or semi-autonomous machine to safely navigate through an environment, the machine may rely on maps—such as navigational, standard-definition (SD), and/or high-definition (HD) maps—corresponding to the environment in which the machine intends to operate. Due to the detailed, three-dimensional, high-precision nature of a map, navigating according to the map has proven effective for safe navigation of environments where map information is available. In some examples, different layers of a map and/or different maps may be generated using various types of sensor data (e.g., different sensor modalities). For example, a first layer of a map and/or a first map may be generated using image data obtained from one or more image sensors (e.g., cameras), a second layer of the map and/or a second map may be generated using RADAR data obtained from one or more RADAR sensors, a third layer of the map and/or a third map may be generated using LiDAR data obtained from one or more LiDAR sensors, and/or so forth.

However, in some examples, generating and/or providing such layers of a map may be challenging. For example, conventional systems that generate certain layers of a map, such as layers that are associated with RADAR data and/or LiDAR data, may require a large amount of computing resources, such as processing resources and/or memory resources. This is because of the amount to sensor data that is obtained and/or the amount of processing that is required on the sensor data to generate these layers. Additionally, and for similar reasons, conventional systems that provide these layers to machines may also require a large amount of computing resources, such as network resources, based on the amount to data that needs to be communicated to the machines via one or more wireless networks. As such, some conventional systems may generate maps using a single type of sensor data, such as image data, which requires fewer computing resources to generate and/or provide.

However, by only using image data to generate these camera-based maps, it may be difficult for machines that use these camera-based maps to perform certain operations with as much precision or accuracy as desired, such as localization. For example, in some circumstances, a machine is attempting to use a camera-based map may be unable to accurately perform localization within an environment using RADAR data (and/or LiDAR data, sonar data, etc.). This is because the differences in feature extraction that is required to perform localization using image data as compared to performing localization using RADAR data. For instance, camera-based maps may represent landmarks within an environment differently—or with less depth accuracy—as compared to RADAR-based maps and/or may represent landmarks that cannot be detected using RADAR data. In some instances, when performing localization using RADAR data, machines are able to more accurately perform feature extraction using the landmarks representations from RADAR-based maps as compared to performing localization using the landmark representations from camera-based maps.

SUMMARY

Embodiments of the present disclosure relate to augmenting camera-based maps with sensor reflection information (e.g., from RADAR, LiDAR, etc.) and/or performing localization using these augmented camera-based maps for autonomous and/or semi-autonomous systems and applications. Systems and methods described herein may augment map data representing a camera-based map using another type of data (also referred to as "secondary data"), such as RADAR data or LiDAR data. For instance, image data generated using one or more machines navigating within an environment may be used to determine locations associated with landmarks (e.g., objects, features, etc.) located within an environment. The secondary data generated using the machine(s) may then be processed to determine whether the landmarks are associated with sensor reflections (e.g., points represented by the secondary data reflected off the landmarks) or whether the landmarks are not associated with sensor reflections (e.g., points represented by the secondary data did not reflect off the landmarks). Additionally, the camera-based map may then be updated to include at least the locations associated with the landmarks, indications that at least a first portion of the landmarks that are associated with sensor reflections, and/or indications that at least a second portion of the landmarks are not associated with sensor reflections.

Systems and methods are further described herein that may provide the map data to one or more machines that then use the camera-based map to perform one or more operations, such as localization, path planning, navigation, control, etc. For instance, and for a machine, the image-based map may be used to determine (1) one or more locations associated with one or more landmarks located within the environment and (2) that the landmark(s) is associated with sensor reflections. Secondary data generated using the machine may then be analyzed with respect to the location (s) associated with the landmark(s) in order to localize the machine within the environment. Once localized, the localized machine may use the map information to determine path planning, navigation, control, actuation, safety, and/or other operations. As described herein, various techniques may be used to localize the machine, such as using one or more distance transforms areas around the landmark(s) and/or using costs determined based at least on analyzing the distance transform area(s) with respect to points represented by the secondary data. The machine may then perform one or more operations based at least on the localization, such as navigating one or more paths within the environment.

In contrast to conventional systems, the systems of the present disclosure, in some embodiments, are able to generate a camera-based map that is augmented with information associated with secondary data, such as RADAR data and/or LiDAR data. This way, and as described herein in more detail herein, machines are able to still perform localization using the camera-based maps along with other type of sensors. Additionally, in contrast to the conventional systems, the systems of the present disclosure, in some embodiments, are able to generate these augmented camera-based maps, which may be used to perform localization with various types of sensor data, using fewer computing resources. For instance, rather than generating multiple layers of a map using different types of sensor data and/or processing, such as by processing image data and RADAR data, the camera-based map is mainly generated using the image data, but then augmented using information associated with the secondary data. As such, and in contrast to the conventional systems, the camera-based map may not include actual RADAR or LiDAR data, such as point clouds representing the environment, but this data may be leveraged via encoding as attributes in the camera-based map.

BRIEF DESCRIPTION OF THE DRAWINGS

The present systems and methods for techniques for augmenting camera-based maps with sensor reflection information and/or performing localization using these augmented camera-based maps for autonomous and/or semi-autonomous systems and applications are described in detail below with reference to the attached drawing figures, wherein.

DETAILED DESCRIPTION

Figure 1:
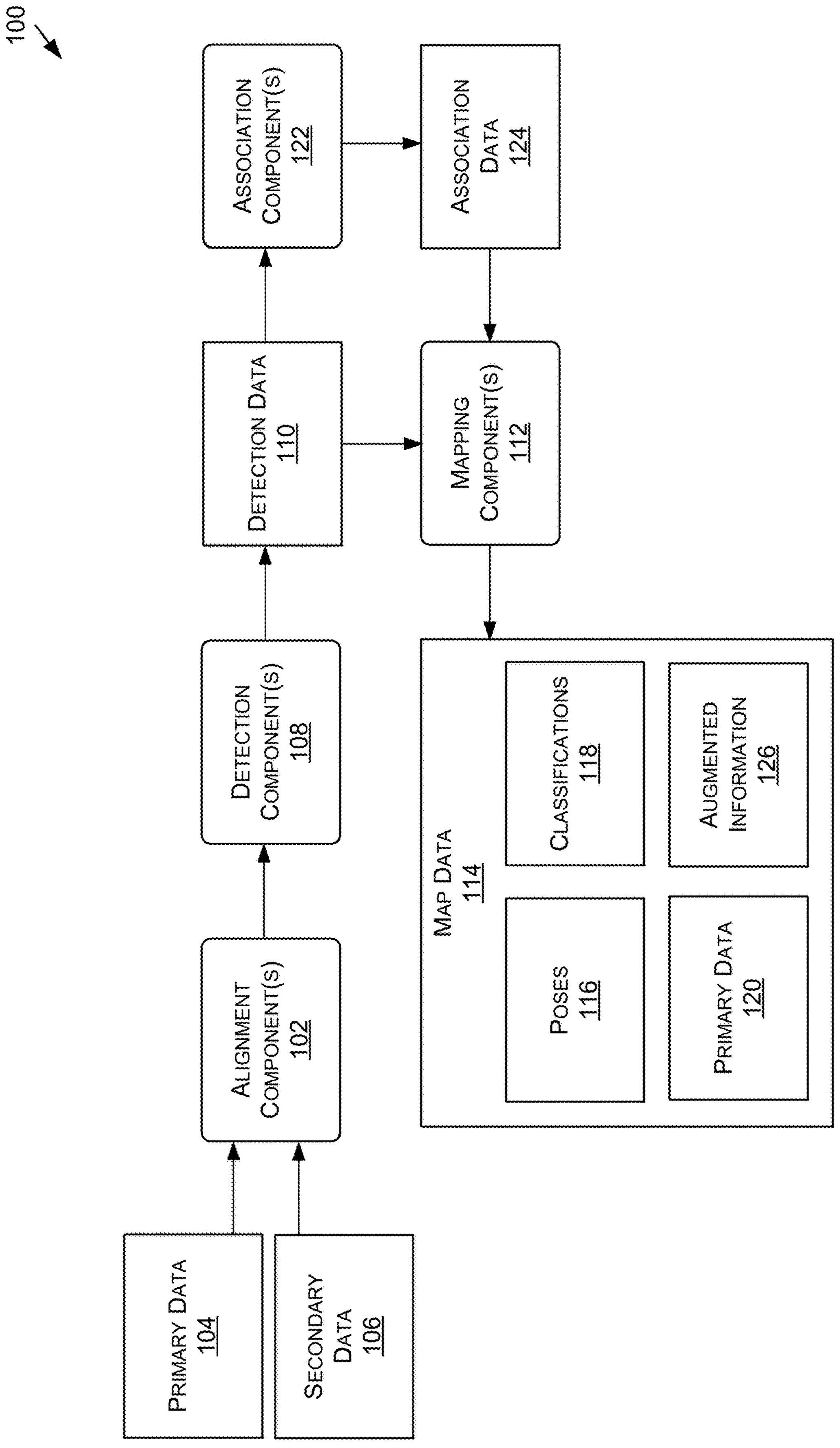
FIG. 1 illustrates an example data flow diagram for a process of generating an augmented map using multiple types of sensor data, in accordance with some embodiments of the present disclosure.

Systems and methods are disclosed related to techniques for augmenting camera-based maps with sensor reflection information and/or performing localization using these augmented camera-based maps for autonomous and/or semi-autonomous systems and applications. Although the present disclosure may be described with respect to an example autonomous or semi-autonomous vehicle or machine 1300 (alternatively referred to herein as "vehicle 1300," "ego-vehicle 1300," "ego-machine 1300," or "machine 1300," an example of which is described with respect to FIGS. 13A-13D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to updating and/or using maps for autonomous or semi-autonomous systems and applications, this is not intended to be limiting, and the systems and methods described herein may be used in augmented reality, virtual reality, mixed reality, robotics, security and surveillance, autonomous or semi-autonomous machine applications, and/or any other technology spaces where maps may be created and/or used may be used.

For instance, a system(s) may receive data generated using one or more machines (e.g., one or more data-collection machines) navigating within an environment. As described herein, in some examples, the data may include sensor data generated using one or more sensors, such as image data generated using one or more image sensors, RADAR data generated using one or more RADAR sensors, LiDAR data generated using one or more LiDAR sensors, ultrasonic data generated using one or more ultrasonic sensors, sonar data generated using one or more sonar sensors, and/or any other type of sensor data generated using any other type of sensor. Additionally, or alternatively, in some examples, the data may represent perception outputs from one or more sources (e.g., machine learning models, neural networks, etc.) that process the sensor data. The system(s) may then use at least a portion of the data to generate one or more maps representing the environment.

For instance, the system(s) may use a first type of sensor data, which may also be referred to as "primary data," to generate the map. For example, if the primary data includes the image data and/or the perception outputs from one or more sources that process the image data, then the system(s) may generate a camera-based map associated with the environment. As described herein, the system(s) may perform any technique to generate the map using the primary data. For instance, in some examples, the system(s) may process the primary data to determine information associated with landmarks that are located within the environment, such as objects (e.g., poles, traffic signs, traffic signals, structures, etc.), features (e.g., traffic lines, road markings, etc.), and/or so forth. As described herein, the information associated with a landmark may include, but is not limited to, a pose (e.g., a location, an orientation, etc.) associated with the landmark, dimensions associated with the landmark, a classification associated with the landmark, an uncertainty associated with the pose, an uncertainty associated with the dimensions, an uncertainty associated with the classification, and/or any other information associated with the landmark. The system(s) may then generate and/or update the map to indicate at least a portion of the information. For example, the system(s) may generate and/or update the map to indicate at least the locations of the landmarks and/or the classifications associated with the landmarks.

The system(s) may then augment the map using a second type of sensor data, which may also be referred to as "secondary data." For example, if the primary data again includes image data and/or perception outputs from one or more sources that process the image data, then the secondary data may include RADAR data or LiDAR data and/or perception outputs from one or more sources that process the RADAR data and/or LiDAR data. In such an example, the system(s) may thus augment the camera-based map with RADAR data. To augment the map, the system(s) may initially align the secondary data with respect to the primary data. For instance, in some examples, such as when the secondary data is generated using the same machine(s) as the primary data, the system(s) may use timing information (e.g., timestamps, etc.) associated with the secondary data and timing information (e.g., timestamps, etc.) associated with the primary data to synchronize the secondary data with the primary data. Additionally, in some examples, the system(s) may transform the secondary data and the primary data into a common coordinate system, such as to align the data together. In some examples, the system(s) may use additional information to perform this transformation, such as parameters (e.g., intrinsic parameters, extrinsic parameters, etc.) associated with the sensor(s) that generated the primary data and/or parameters (e.g., intrinsic parameters, extrinsic parameters, etc.) associated with the sensor(s) that generated the secondary data.

The system(s) may then determine whether the landmarks identified using the primary data are further associated with the secondary data. For a first example, such as when the secondary data represents points (e.g., RADAR points) located within the environment, the system(s) may determine that a landmark is associated with the secondary data 106 when one or more points reflect off the landmark or determine that the landmark is not associated with secondary data when no points reflect off the landmark. For a second example, and again when the secondary data represents points located within the environment, the system(s) may determine that a landmark is associated with the secondary data 106 when a threshold number of points (e.g., one point, five points, ten points, twenty points, etc.) reflect off the landmark or determine that the landmark is not associated with secondary data when a threshold number of points do not reflect off the landmark. While these are just a few example techniques for determining whether landmarks are associated with the secondary data, in other examples, the system(s) may use one or more additional and/or alternative techniques to determine whether the landmarks are associated with the secondary data.

For a first example technique of determining whether landmarks are associated with the secondary data, the system(s) may determine areas (e.g., two-dimensional (2D) areas, three-dimensional (3D) areas, etc.) within the environment that are associated with the landmarks. In some examples, the areas of the environment may include the locations of the landmarks determined using the primary data while, in other examples, the areas of the environment may include portions of the environment that at least partially surround the locations of the landmarks. Additionally, in some examples, the system(s) may determine the areas of the environment using additional information, such as the uncertainties associated with the locations of the landmarks within the environment. For a landmark, the system(s) may then determine that the secondary data is associated with the landmark when one or more points associated with the secondary data are located within the area(s) of the landmark or determine that the secondary data is not associated with the landmark when no points are located within the area(s) of the landmark.

For a second example technique of determining whether landmarks are associated with the secondary data, the system(s) may determine areas of sensor representations (e.g., images) that are associated with the landmarks. In some examples, the areas of the sensor representations may include points (e.g., pixels) that represent the landmarks within the sensor representations while, in other examples, the areas of the sensor representations may include the points along with additional points that at least partially surround the landmarks (e.g., bounding shapes, etc.). Additionally, in some examples, the system(s) may determine the areas of the sensor representations using additional information, such as the uncertainties associated with the locations of the landmarks within the environment. The system(s) may then project the points associated with the secondary data to 2D points associated with the sensor representations. For a landmark, the system(s) may then determine that the secondary data is associated with the landmark when one or more 2D points are located within the area(s) of the sensor representation(s) or determine that the secondary data is not associated with the landmark when no 2D points are located within the area(s) of the sensor representation(s).

In some examples, such as for the landmarks that are further associated with the secondary data, the system(s) may determine additional information associated with the landmarks. For example, the system(s) may determine numbers of points that are associated with the landmarks (e.g., numbers of points that are located within the areas and/or reflect off the landmarks). The system(s) may then determine weights associated with the landmarks based at least on the numbers of points. For example, the system(s) may determine that landmarks that are associated with a greater number of points include a higher weight as compared to landmarks that are associated with a fewer number of points. In other words, the weights may indicate a likelihood that points associated with the second type of data may reflect off the landmarks.

The system(s) may then augment (e.g., update) the map based at least on the associations between the landmarks and the secondary data. For instance, the system(s) may update the map to indicate which landmarks are associated with the secondary data (e.g., which landmarks are associated with sensor reflections), which landmarks are not associated with the secondary data (e.g., which landmarks are not associated with sensor reflections), the weights associated with the landmarks, and/or any other information. As such, by performing the processes described herein, the system(s) is able to generate the map using the primary data, such as image data, but then further augment the map using the secondary data, such as RADAR and/or LiDAR data. This way, one or more machines that are navigating within the environment may use different types of data to perform processes with respect to the map. For example, if the map includes a camera-based map that is augmented using RADAR data, the machines(s) may perform localization using both (1) image data and/or perception outputs associated with the image data and (2) RADAR data and/or perception outputs associated with the RADAR data.

For instance, the system(s) may send the map to a machine navigating within the environment. In some examples, the system(s) may send the map based at least on the occurrence of one or more events, such as receiving a request for the map, receiving data indicating that the machine is located within the environment, and/or any other event. The machine may then use the map to perform one or more operations, such as localizing the machine within the environment. As described herein, in some examples, since the map is generated using the primary data, but then augmented using the secondary data, the machine may be able to perform localization using both a first type of sensor data that corresponds to the primary data as well as a second type of sensor data that corresponds to the secondary data.

For a first example, if the map includes a camera-based map where the primary data includes image data, then the machine may generate image data using one or more image sensors of the machine. The machine may then perform any type of localization technique to localize the machine within the environment based at least on the image data and the camera-based map. For instance, the machine the compare image data and/or perception outputs associated with the image data to the information from the camera-based map. In some examples, based at least on the comparing, the machine may match one or more landmarks represented by the image data and/or the perception outputs to one or more landmarks represented by the camera-based map. Based at least on the matching, the machine may determine a pose of the machine within the environment. As described herein, a pose may include a location (e.g., the x-coordinate location, the y-coordinate location, and/or the z-coordinate location), an orientation (e.g., a roll, a pitch, and/or a yaw), a relative location of the machine with respect to a driving surface (e.g., a lane, a road, etc.), and/or any other location information associated with the machine. In some examples, such as to improve the performance of the localization, the machine may perform these processes over a period of time (e.g., using temporal smoothing or tracking) using additional image data generated using the image sensor(s).

For a second example, and in addition to or alternatively from performing the camera-based localization, if the camera-based map is augmented with RADAR data, then the machine may generate RADAR data using one or more RADAR sensors. The machine may then analyze the information associated with the camera-based map to determine one or more landmarks that are associated with sensor reflections (e.g., RADAR reflections). Additionally, to perform the localization, the machine may compare the RADAR data and/or perception outputs associated with the RADAR data to the information associated with the landmark(s) stored in the camera-based map.

For instance, and for a landmark, the machine may determine one or more distance transform areas that at least partially surround the landmark. As described herein, a respective distance transform area may be associated with a distance around the landmark. For instance, a first distance transform area may be associated with a first distance around the landmark, a second distance transform area may be associated with a second distance around the landmark, a third distance transform area may be associated with a third distance around the landmark, and/or so forth. The machine may then predict a pose associated with the machine within the environment. Using the predicted pose, the machine may determine one or more costs based at least on comparing points represented by the RADAR data to the distance transform areas associated with the landmark(s). For example, the further the points are from the location(s) of the landmark(s) and using distance transform areas, the greater the cost(s), and the closer the points are to the location(s) of the landmark(s) and using the distance transform areas, the lower the cost(s).

The machine may then continue to perform similar processes for one or more additional predicted poses associated with the machine within the environment to determine one or more additional costs. Using the costs for the predicted poses, the machine may then determine a final pose associated with the machine within the environment. For instance, in some examples, the machine may determine the final pose as including the predicted pose that is associated with the lowest cost(s). In some examples, such as to improve the performance of the localization, the machine may then perform these processes over a period of time using additional RADAR data generated using the RADAR sensor(s).

In some examples, such as when the machine performs both the camera-based localization and the RADAR-based localization, the machine may then determine a fused pose based at least on the camera-based pose and the RADAR-based pose. For example, the machine may determine the fused pose by taking the average of the camera-based pose and the RADAR-based pose, weighting one or more of the camera-based pose or the RADAR-based pose, and/or using any other technique. This way, even though the machine is using a camera-based map that is generated using image data, the machine is still able to perform localization using both image data and RADAR data, which may improve the overall performance of localizing the machine.

While these examples include using the camera-based map that is augmented with RADAR data, in other examples, the machine may perform similar processes using other types of maps, such as a camera-based map that is augmented with LiDAR data, ultrasonic data, sonar data, and/or any other type of data. In any of these examples, by performing one or more of the processes described herein, the machine may be able to perform various types of localization using a map that is primarily generated using a single type of sensor data, but with additional information added for one or more other types of sensor data.

In some embodiments, the systems and methods described herein may be performed within a simulation environment (e.g., NVIDIA's DriveSIM) using simulated data (e.g., simulated sensor data of simulated sensors of a virtual or simulated machine). For example, simulated sensor data and/or map data (simulated or real) may be used to perform various operations within the simulation environment, such as to perform localization with respect to the map data using simulated image data, simulated RADAR data, and/or other simulated sensor data. These simulated operations may be used to test performance of the underlying algorithms, systems, and/or processes prior to deploying them in the real-world. In some instances, the simulation may be used to generate synthetic training data—e.g., training data including landmarks, features, objects, etc.—so that the synthetic training data (in addition to or alternatively from real-world data) may then be processed to perform localization, update virtual or simulated maps, and/or perform other operations. In any example, such as where a simulation environment is used for testing, validation, training, etc., the simulation environment and/or associated training data may be rendered or otherwise generated using one or more light transport algorithms-such as ray-tracing and/or path-tracing algorithms. In some embodiments, the simulation environment and/or one or more objects, features, or components thereof may be generated or managed within a three-dimensional (3D) content collaboration platform (e.g., NVIDIA's OMNIVERSE) for industrial digitalization, generative physical AI, and/or other use cases, applications, or services. For example, the content collaboration platform or system may include a system for using or developing universal scene descriptor (USD) (e.g., OpenUSD) data for managing objects, features, scenes, etc. within a simulated environment, digital environment, etc. The platform may include real physics simulation, such as using NVIDIA's PhysX SDK, in order to simulate real physics and physical interactions with simulations hosted by the platform. The platform may integrate OpenUSD along with ray tracing/path tracing/light transport simulation (e.g., NVIDIA's RTX rendering technologies) into software tools and simulation workflows for building, training, deploying, or testing AI systems—such as systems for testing, validating, training (e.g., machine learning models, neural networks, etc.), and/or other tasks related to automotive, robot, machine, or other applications.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems implementing large language models (LLMs), systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

With reference to FIG. 1, FIG. 1 illustrates an example data flow diagram for a process 100 of generating an augmented map using multiple types of sensor data, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1300 of FIGS. 13A-13D, example computing device 1400 of FIG. 14, and/or example data center 1500 of FIG. 15.

The process 100 may include one or more alignment components 102 receiving primary data 104 and secondary data 106 generated using one or more machines (e.g., an example autonomous vehicle 1300) navigating within an environment. As described herein, the primary data 104 may include a first type or modality of sensor data and/or first perception outputs associated with the first type or modality of sensor data while the secondary data 106 may include a second type or modality of sensor data and/or second perception outputs associated with the second type or modality of sensor data. Additionally, a type or modality of sensor data may include, but is not limited to, image data generated using one or more image sensors, RADAR data generated using one or more RADAR sensors, LiDAR data generated using one or more LiDAR sensors, ultrasonic data generated using one or more ultrasonic sensors, sonar data generated using one or more sonar sensors, and/or any other type of sensor data generated using any other type of sensor (e.g., any other type of sensor modality). For example, the primary data 104 may include image data and/or perception outputs associated with the image data while the secondary data 106 includes RADAR data and/or perception outputs associated with the RADAR data.

Figure 2:
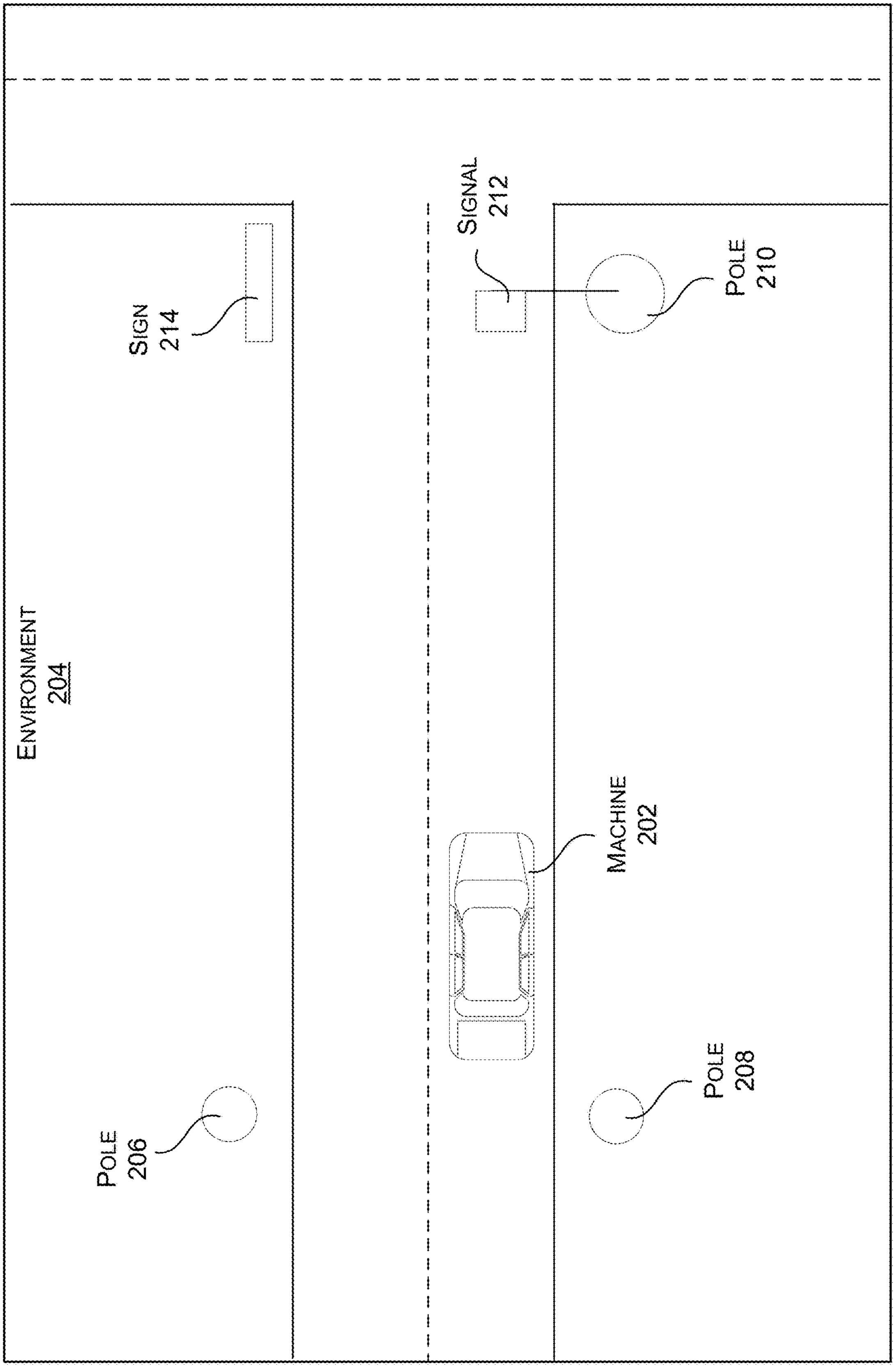
FIG. 2 illustrates an example of a machine generating various types of sensor data while navigating within an environment, in accordance with some embodiments of the present disclosure.

For instance, FIG. 2 illustrates an example of a machine 202 (which may represent, and/or be similar to, an example autonomous vehicle 1300) generating various types of sensor data while navigating within an environment 204, in accordance with some embodiments of the present disclosure. For instance, while navigating within the environment 204, the machine 202 may generate at least first data that includes a first type of sensor data, such as image data using one or more image sensors, and/or first perception outputs associated with the first type of sensor data. Additionally, the machine 202 may generate second data that includes a second type of sensor data, such as RADAR data using one or more RADAR sensors, and/or second perception outputs associated with the second type of sensor data. As described herein, the data may represent the environment 204, such as landmarks located within the environment 204. For instance, and in the example of FIG. 2, the data may represent one or more object and/or features, such as a pole 206, a pole 208, a pole 210, a traffic signal 212, and a traffic sign 214. However, in other examples, the data may represent any other type of object and/or feature.

Referring back to the example of FIG. 1, the process 100 may include the alignment component(s) 102 aligning the primary data 104 with respect to the secondary data 106. As described herein, in some examples, such as when the secondary data 106 is generated using the same machine(s) as the primary data 104, the alignment component(s) 102 may use timing information (e.g., timestamps, etc.) associated with the primary data 104 and timing information (e.g., timestamps, etc.) associated with the secondary data 106 to synchronize the primary data 104 with respect to the secondary data 106. For example, the alignment component(s) 102 may match frames associated with the primary data 104 with frames associated with the secondary data 106 using the timestamps. Additionally, in some examples, the alignment component(s) 102 may transform the primary data 104 and the secondary data 106 into a common coordinate system, such as to align the data together. In some examples, the alignment component(s) 102 may use additional information to perform this transformation, such as parameters (e.g., intrinsic parameters, extrinsic parameters, etc.) associated with the sensor(s) that generated the primary data 104 and/or parameters (e.g., intrinsic parameters, extrinsic parameters, etc.) associated with the sensor(s) that generated the secondary data 106.

The process 100 may include one or more detection components 108 processing at least the primary data 104 in order to determine information associated with landmarks located within the environment. As descried herein, to perform the processing, the detection component(s) 108 may include and/or use one or more machine learning models, one or more neural networks, one or more algorithms, one or more perception systems, one or more classification systems, one or more localization systems, and/or any other type of processing component that is configured to perform one or more of the processes described herein. Additionally, the landmarks may include, but are not limited to, objects (e.g., poles, traffic signs, traffic signals, structures, etc.), features (e.g., traffic lines, road markings, etc.), and/or any other type of landmark that may be located within the environment and/or detected using the primary data 104 and/or the secondary data 106.

As described herein, the detection component(s) 108 may determine various types of information associated with the landmarks. For instance, and for a landmark, the detection component(s) 108 may determine a pose (e.g., a location, an orientation, etc.) associated with the landmark, dimensions associated with the landmark, a classification associated with the landmark, an uncertainty associated with the pose, an uncertainty associated with the dimensions, an uncertainty associated with the classification, and/or any other information associated with the landmark. Additionally, as described herein, a location may include, but is not limited to, a 2D location (e.g., the x-coordinate location and the y-coordinate location), a 3D location (e.g., the x-coordinate location, the y-coordinate location, and the z-coordinate location), a relative location, and/or any other type of location associated with the landmark. In some examples, the detection component(s) 108 may determine respective information associated with one or more (e.g., each) frame associated with the primary data 104. In some examples, the detection component(s) 108 may determine the information using multiple frames associated with the primary data 104. For example, the detection component(s) 108 may determine at least the locations of the landmarks using multiple frames generated using multiple sensors, such as by using triangulation.

In some examples, the process 100 may also include the detection component(s) 108 processing the secondary data 106 in order to determine additional information associated with one or more of the landmarks, where the additional information may be similar to the information determined using the primary data 104. For instance, and for a landmark, the detection component(s) 108 may process the secondary data 106 to determine a pose (e.g., a location, an orientation, etc.) associated with the landmark, dimensions associated with the landmark, a classification associated with the landmark, an uncertainty associated with the pose, an uncertainty associated with the dimensions, an uncertainty associated with the classification, and/or any other information associated with the landmark. As shown, the process 100 may then include the detection component(s) 108 generating and/or outputting detection data 110 representing the information associated with the landmarks.

Figure 3:
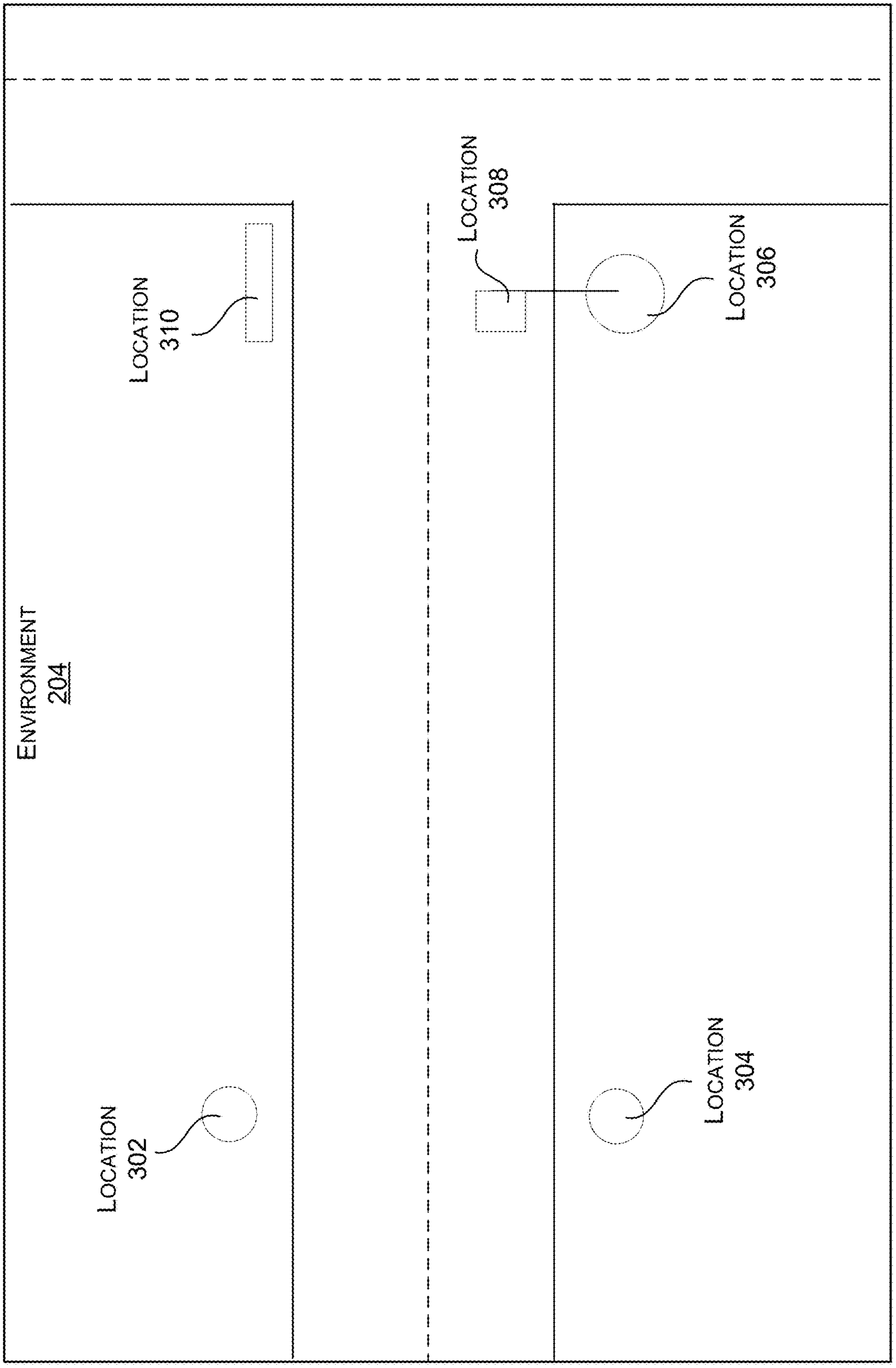
FIG. 3 illustrates an example of determining information associated with landmarks located within an environment, in accordance with some embodiments of the present disclosure.

For instance, FIG. 3 illustrates an example of determining information associated with landmarks located within the environment 204, in accordance with some embodiments of the present disclosure. As shown, the detection component(s) 108 may process at least a portion of the primary data generated using the machine 202. Based at least on the processing, the detection component(s) 108 may determine at least a location 302 associated with the pole 206, a location 304 associated with the pole 208, a location 306 associated with the pole 210, a location 308 associated with the traffic signal 212, and a location 310 associated with the traffic sign 214. Additionally, in some examples, the detection component(s) 108 may determine additional information based at least on the processing, such as a classification (e.g., pole) associated with the pole 206, a classification (e.g., pole) associated with the pole 208, a classification (e.g., pole) associated with the pole 210, a classification (e.g., traffic signal) associated with the traffic signal 212, and a classification (e.g., traffic sign) associated with the traffic sign 214.

Referring back to the example of FIG. 1, the process 100 may include one or more mapping component(s) 112 using at least the detection data 110 to generate and/or update a map associated with the environment, where the map may be represented by map data 114. As shown, the map may represent at least a portion of the information as represented by the detection data 110, such as poses 116 associated with the landmarks as determined using the primary data 104, classifications 118 associated with the landmarks as determined using the primary data 104, and/or any other information (e.g., the uncertainties, etc.). Additionally, in some examples, the map may be associated with at least a portion of the primary data 104 used to generate and/or update the map, where the at least the portion of the primary data 104 may be represented by primary data 120. In other words, the map may be associated with the primary data 104, such as including a camera-based map generated using image data, a RADAR-based map generated using RADAR data, a LiDAR-based map generated using LiDAR data, and/or the like.

However, and as also described herein, the map may be augmented using at least a portion of the secondary data 106 such that the map additionally includes information associated with the second type of sensor data. For instance, the process 100 may include one or more association components 122 using at least a portion of the detection data 110 and/or at least a portion of the secondary data 106 to associate one or more of the detected landmarks with the secondary data 106. For a first example, such as when the secondary data 106 represents points (e.g., RADAR points) located within the environment, the association component(s) 122 may determine that a landmark is associated with the secondary data 106 when one or more points reflect off the landmark or determine that the landmark is not associated with secondary data when no points reflect off the landmark. For a second example, and again when the secondary data 106 represents points located within the environment, the association component(s) 122 may determine that a landmark is associated with the secondary data 106 when a threshold number of points (e.g., one point, five points, ten points, twenty points, etc.) reflect off the landmark or determine that the landmark is not associated with secondary data when a threshold number of points do not reflect off the landmark. While these are just a few example techniques for determining whether landmarks are associated with the secondary data 106, in other examples, the association component(s) 122 may use additional and/or alternative techniques to determine whether the landmarks are associated with the secondary data 106.

For more detail, and for a first example technique, the association component(s) 122 may determine areas (e.g., 2D areas, 3D areas, etc.) within the environment that are associated with the landmarks. In some examples, the areas of the environment may include the locations of the landmarks determined using the primary data 104 while, in other examples, the areas of the environment may include portions of the environment that at least partially surround the locations of the landmarks. Additionally, in some examples, the association component(s) 122 may determine the areas of the environment using additional information, such as the uncertainties associated with the locations of the landmarks within the environment. The association component(s) 122 may then determine that the secondary data 106 is associated with landmarks for which points represented by the secondary data 106 are located within the areas, which may indicate that the points reflected off the landmarks, and determine that the secondary data 106 is not associated with landmarks for which points represented by the secondary data 106 are not located within the areas, which may indicate that points did not reflect off the landmarks.

Figure 4A:
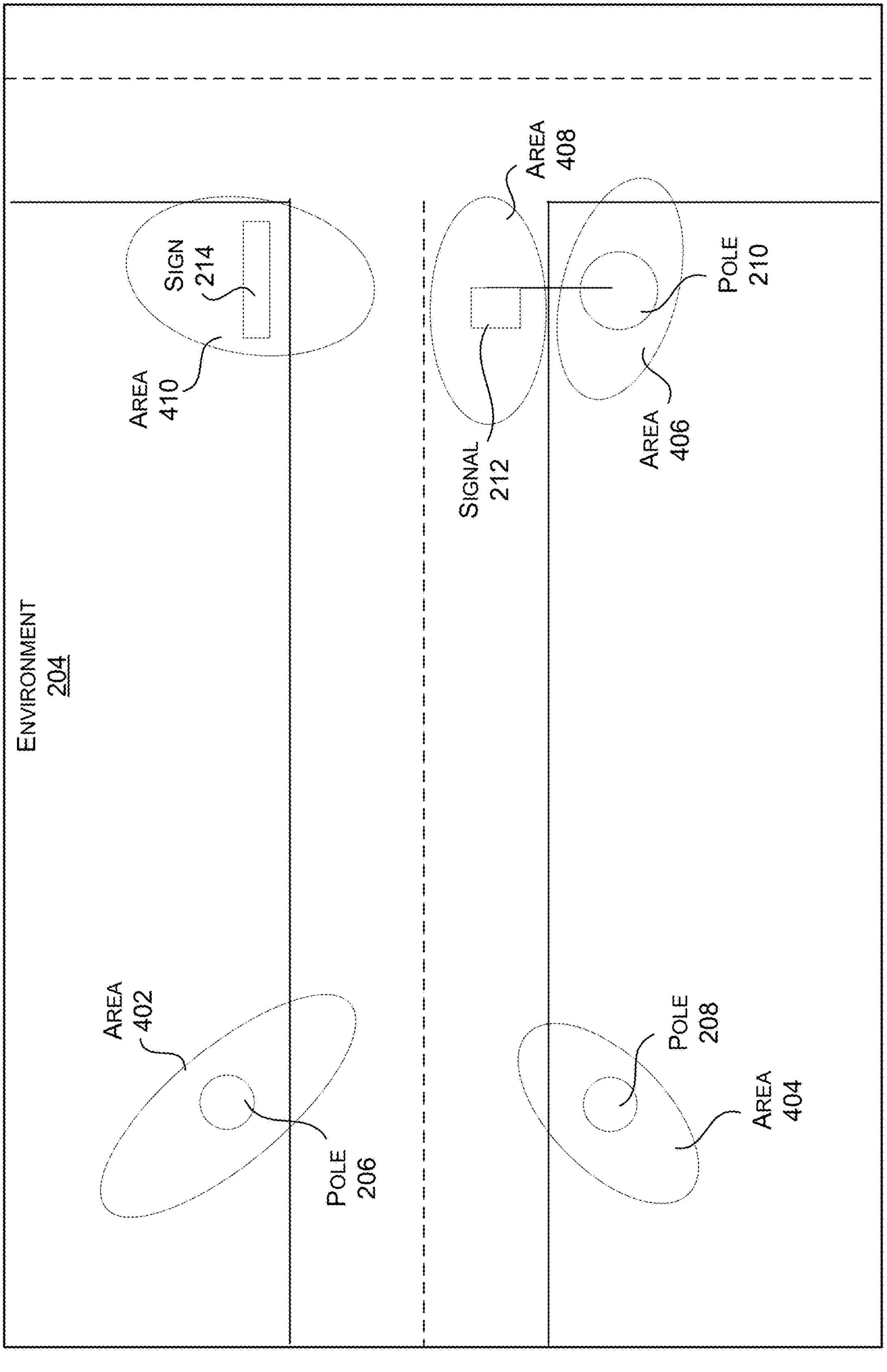
FIGS. 4A-4B illustrate a first example of determining whether landmarks are associated with secondary sensor data, in accordance with some embodiments of the present disclosure.
Figure 4B:
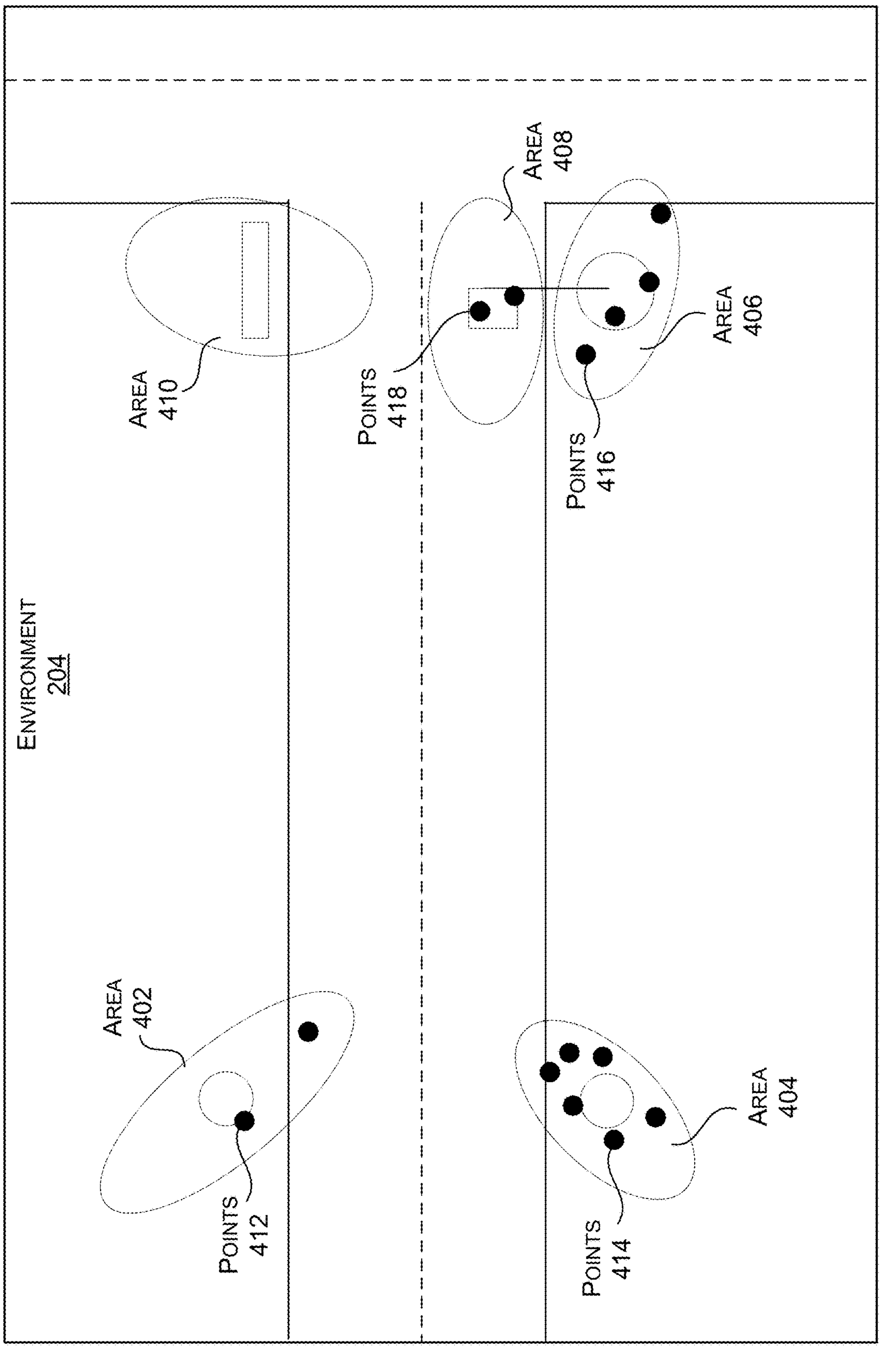

For instance, FIGS. 4A-4B illustrate a first example of determining whether landmarks are associated with secondary data, in accordance with some embodiments of the present disclosure. As shown by the example of FIG. 4A, the association component(s) 122 may initially determine an area 402 around the pole 206, an area 404 around the pole 208, an area 406 around the pole 210, an area 408 around the traffic signal 212, and an area 410 around the traffic sign 214. As described herein, in some examples, the association component(s) 122 may use one or more techniques to determine the areas 402-410. For instance, the association component(s) 122 may determine the areas 402-410 based at least on the uncertainties associated with the landmarks, such that the sizes of the areas 402-410 increases as the uncertainties associated with the landmarks also increases.

Next, and as illustrated by the example of FIG. 4B, the association component(s) 122 may use locations of points represented by the secondary data that is generated using the machine 202 to determine whether one or more of the landmarks are associated with the secondary data. For instance, and as shown, the association component(s) 122 may determine that points 412 (although only one is labeled for clarity reasons) are located within the area 402, points 414 (although only one is labeled for clarity reasons) are located with the area 404, points 416 (although only one is labeled for clarity reasons) are located within the area 406, and points 418 (although only one is labeled for clarity reasons) are located within the area 408. As such, the association component(s) 122 may determine that the pole 206 is associated with the secondary data (e.g., sensor reflections), the pole 208 is associated with the secondary data (e.g., sensor reflections), the pole 210 is associated with the secondary data (e.g., sensor reflections), and the traffic signal 212 is associated with the secondary data (e.g., sensor reflections). However, the association component(s) 122 may further determine that the traffic sign 214 is not associated with the secondary data (e.g., no sensor reflections).

In some examples, the association component(s) 122 may use one or more techniques to determine when a point is located within an area associated with a landmark. For a first example, if the area includes a 2D area, then the association component(s) 122 may determine that the point is located within the area based at least on two dimensions associated with the point being located within the area, such as the x-coordinate direction and the y-coordinate direction (e.g., the point may be located above the area on the ground). For a second example, if the area includes a 3D area, then the association component(s) may determine that the point is located within the area based at least on the point being within the 3D area. While these are just two example techniques for how to determine whether a point is located within an area, in other examples, the association component(s) 122 may use additional and/or alternative techniques.

Referring back to the example of FIG. 1, and for another example of determining whether landmarks are associated with the secondary data 106, the association component(s) 122 may determine areas of sensor representations (e.g., images) that are associated with the landmarks. In some examples, the areas of the sensor representations may include points (e.g., pixels) that represent the landmarks within the sensor representations while, in other examples, the areas of the sensor representations may include the points that represent the landmarks along with additional points that at least partially surround the landmarks (e.g., bounding shapes, etc.). Additionally, in some examples, the association component(s) 122 may determine the areas of the sensor representations using additional information, such as the uncertainties associated with the locations of the landmarks within the environment.

The association component(s) 122 may then project the 3D points represented by the secondary data 106 to 2D points associated with the sensor representations. Additionally, the association component(s) 122 may then determine that the secondary data 106 is associated with landmarks for which 2D points are located within the areas, which may indicate that points reflected off the landmarks, and determine that the secondary data 106 is not associated with landmarks for which points represented by the secondary data 106 are not located within the areas, which may indicate that points did not reflect off the landmarks.

Figure 5:
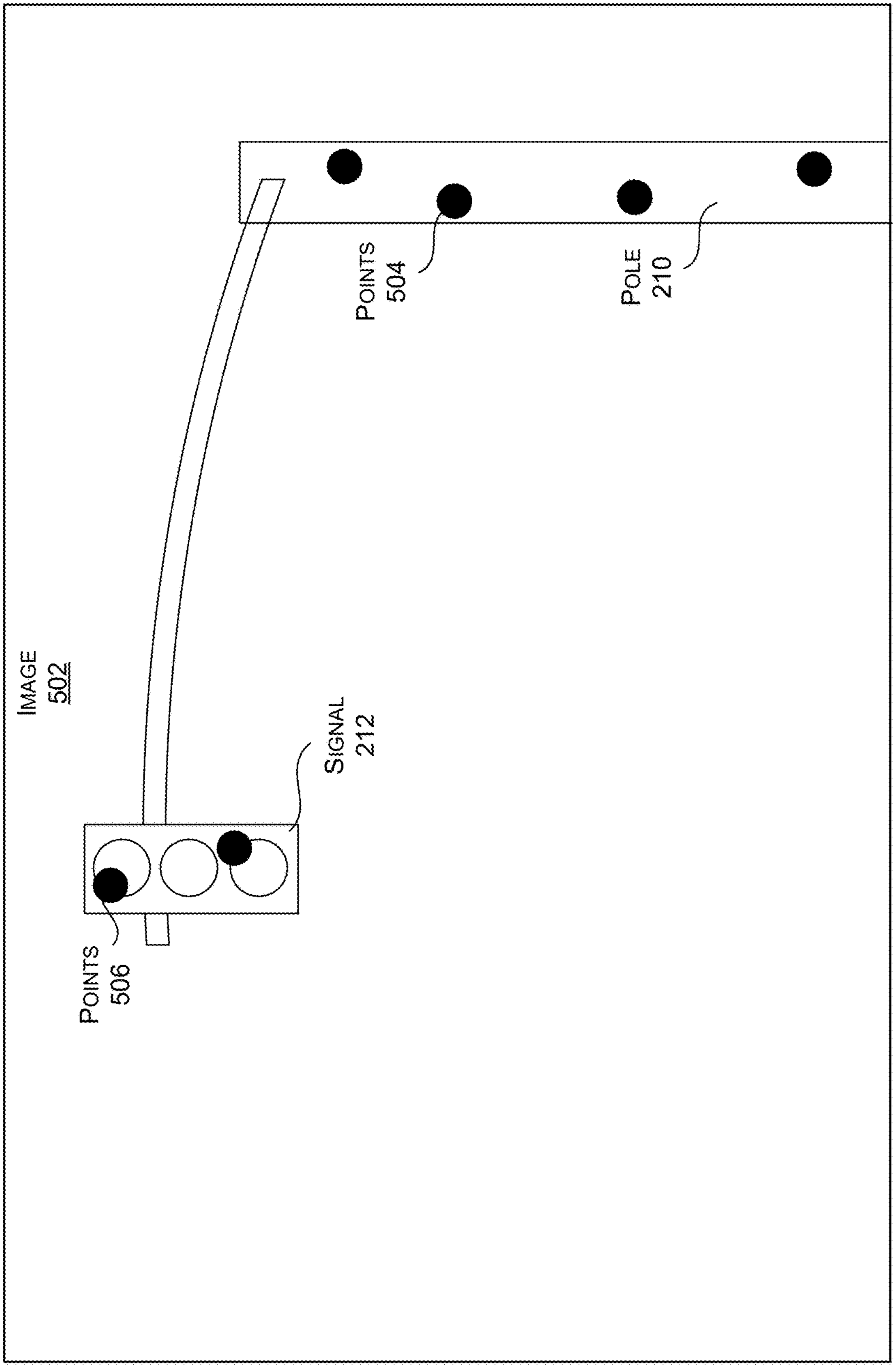
FIG. 5 illustrates a second example of determining whether landmarks are associated with secondary sensor data, in accordance with some embodiments of the present disclosure.

For instance, FIG. 5 illustrates a second example of determining whether landmarks are associated with secondary data, in accordance with some embodiments of the present disclosure. As shown, the association component(s) 122 may determine a first portion of an image 502 that is associated with the pole 210 (e.g., pixels that represent the pole 210) and a second portion of the image 502 that is associated with the traffic signal 212 (e.g., pixels that represent the traffic signal 212), where the image 502 may include a sensor representation of image data. The association component(s) 122 may then determine that points 504 (although only one is labeled for clarity reasons) are located within the first portion of the image 502 and points 506 (although only one is labeled for clarity reasons) are located within the second portion of the image 502. As such, the association component(s) 122 may again determine that the pole 210 is associated with the secondary data (e.g., sensor reflections) and that the traffic signal 212 is also associated with the secondary data (e.g., sensor reflections).

Referring back to the example of FIG. 1, in some examples, such as for the landmarks that are further associated with the secondary data, the association component(s) 122 may determine additional information associated with the landmarks. For example, the association component(s) may determine numbers of points that are associated with the landmarks (e.g., numbers of points that are located within the areas). The association component(s) 122 may then determine weights associated with the landmarks based at least on the numbers of points. For examples, the association component(s) 122 may determine that landmarks that are associated with a greater number of points include a higher weight, such as the pole 208 in the example of FIG. 4B, as compared to landmarks that are associated with a fewer number of points, such as the pole 206 in the example of FIG. 4B. In other words, the weights may indicate a likelihood that points associated with the second type of data may reflect off the landmarks.

The process 100 may then include the association component(s) 122 generating and/or outputting association data 124. In some examples, the association data 124 may represent one or more landmarks that are associated with the secondary data 106 (e.g., there were sensor reflections), one or more landmarks that are not associated with the secondary data 106 (e.g., there were no sensor reflections), one or more weights associated with the landmark(s) that is associated with the secondary data 106, and/or any other information associated with the associations between the landmark(s) and the secondary data 106.

The process 100 may then include the mapping component(s) 112 using at least a portion of the association data 124 to augment the map with information associated with the secondary data 106, where the information may be represented by augmented information 126. For instance, in some examples, the mapping component(s) 112 may augment the map by adding information indicating the landmark(s) that is associated with the secondary data 106 (e.g., there were sensor reflections), the landmark(s) that is not associated with the secondary data (e.g., there were no sensor reflections), the weight(s) associated with landmark(s) that is associated with the secondary data 106, and/or any other information. While the example of FIG. 1 illustrates augmenting the map using one type of secondary data 106, in other examples, similar processes may be used to augment the map using multiple types of secondary data 106. For example, the map may be augmented with RADAR data, LiDAR data, sonar data, and/or so forth.

Figure 6:
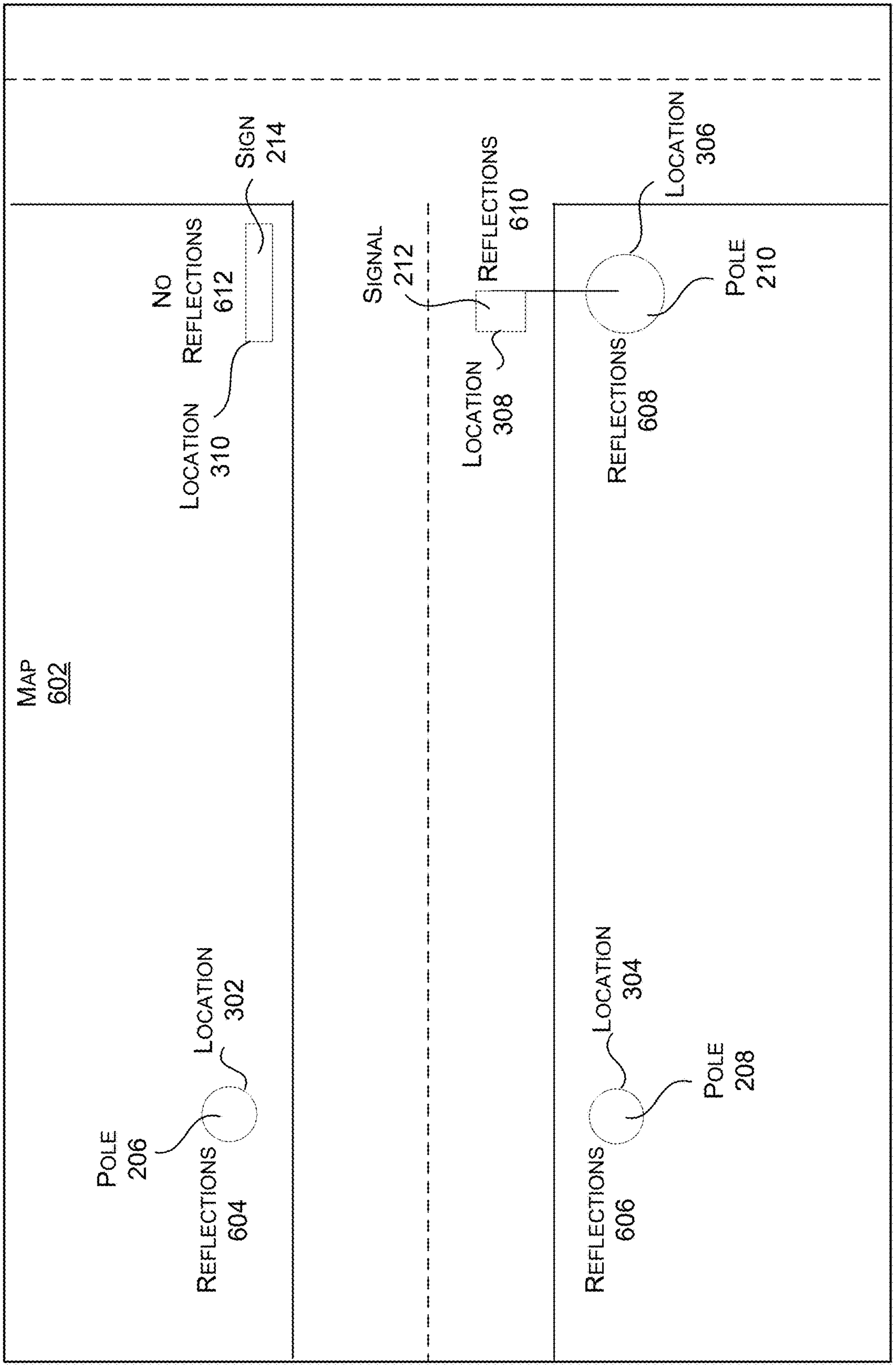
FIG. 6 illustrates an example of augmenting a map with information associated with secondary sensor data, in accordance with some embodiments of the present disclosure.

For instance, FIG. 6 illustrates an example of augmenting a map 602 with information associated with secondary data, in accordance with some embodiments of the present disclosure. As shown, the mapping component(s) 112 may initially generate and/or update the map 602 to include a classification associated with the pole 206, the location 302 associated with the pole 206, a classification associated with the pole 208, the location 304 associated with the pole 208, a classification associated with the pole 210, the location 306 associated with the pole 210, a classification associated with the traffic signal 212, the location 308 associated with the traffic signal 212, a classification associated with the traffic sign 214, and the location 310 associated with the traffic sign 214. Additionally, the mapping component(s) 112 may augment the map 602 to include an indication 604 that the pole 206 is associated with sensor reflections, an indication 606 that the pole 208 is associated with sensor reflections, an indication 608 that the pole 210 is associated with sensor reflections, an indication 610 that the traffic signal 212 is associated with sensor reflections, and an indication 612 that the traffic sign 214 is not associated with sensor reflections.

In some examples, one or more machines may then use the augmented map to perform one or more operations, such as localization. In some examples, since the map is generated using the primary data 104, but then augmented with information associated with the secondary data 106, the machine(s) may be able to perform localization using various types of data, such as a first type of sensor data that is similar to the primary data 104 and/or a second type of sensor data that is similar to the secondary data 106.

Figure 7:
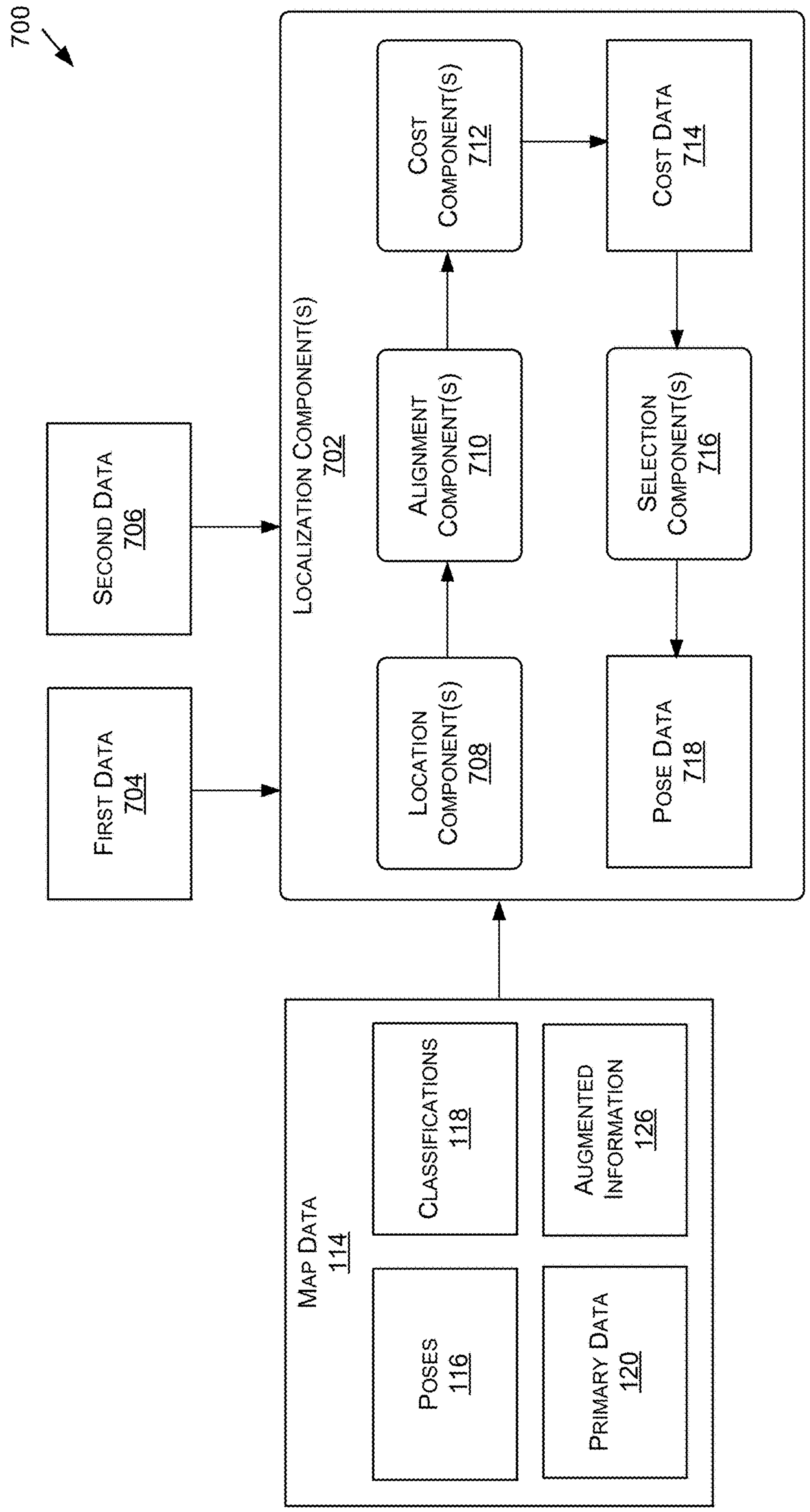
FIG. 7 illustrates an example data flow diagram for a process of performing localization using an augmented map, in accordance with some embodiments of the present disclosure.

For instance, FIG. 7 illustrates an example data flow diagram for a process 700 of performing localization using an augmented map, in accordance with some embodiments of the present disclosure. The process 700 may include one or more localization components 702 receiving the map data 114, first data 704 associated with a first type of sensor, and/or second data 706 associated with a second type of sensor. As described herein, the first data 704 may include first sensor data generated using the first type of sensor, perception outputs associated with the first sensor data, and/or any other data, where the first type of sensor includes a same type of sensor that is associated with the primary data 104 from the example of FIG. 1. Additionally, the second data 706 may include second sensor data generated using the second type of sensor, perception outputs associated with the second sensor data, and/or any other data, where the second type of sensor includes a same type of sensor that is associated with the secondary data 106 from the example of FIG. 1. For example, the first data 704 may be associated with one or more image sensors while the second data 706 is associated with one or more RADAR sensors.

The process 700 may then include the localization component(s) 702 performing localization using the map data 114, the first data 704, and/or the second data 706. For a first example, if the map includes a camera-based map where the primary data 104 includes image data, then the first data 104 may include image data and/or perception outputs associated with the image data. As such, the localization component(s) 702 perform any type of localization technique to localize the machine within the environment based at least on the image data and the camera-based map.

For instance, the localization component(s) 702 may compare the image data and/or the perception outputs associated with the image data to the information from the camera-based map. In some examples, based at least on the comparing, the localization component(s) 702 may match one or more landmarks represented by the image data and/or the perception outputs to one or more landmarks represented by the camera-based map. Based at least on the matching, the localization component(s) 702 may determine a pose of the machine within the environment. As described herein, a pose may include a location (e.g., the x-coordinate location, the y-coordinate location, and/or the z-coordinate location), an orientation (e.g., a roll, a pitch, and/or a yaw), a relative location of the machine with respect to a driving surface (e.g., a lane, a road, etc.), and/or any other location information associated with the machine. In some examples, such as to improve the performance of the localization, the localization component(s) 702 may perform these features over a period of time using additional image data generated using the image sensor(s).

In addition to, or alternatively from, performing the localization using the sensor data that is associated with the map, the localization component(s) 702 may perform localization using the sensor data for which the map is augmented. For example, if the map includes the camera-based map that is augmented with RADAR data, then the localization component(s) may use the second data 706 that includes RADAR data and/or perception outputs associated with the RADAR data to perform localization with respect to the camera-based map. In some examples, since the map is augmented with information associated with the secondary data 106, rather than being specifically generated using the secondary data 106, the localization component(s) 702 may use one or more different techniques to perform the localization.

For instance, the process 700 may include the localization component(s) 702 using one or more location components 708 to determine one or more locations associated with one or more landmarks from the map. As described herein, in some examples, the location component(s) 708 may determine the location(s) associated with the landmark(s) for which the secondary data 106 was associated. For example, and again if the map is augmented with RADAR data, then the location component(s) 708 may use the map to determine the location(s) of the landmark(s) that is associated with RADAR reflections. In some examples, and for an individual landmark, the location component(s) 708 may then determine one or more distance transform areas that at least partially surround the landmark. As described herein, a respective distance transform area may be associated with a specific distance around the landmark. For instance, a first distance transform area may be associated with a first distance around the landmark, a second distance transform area may be associated with a second distance around the landmark, a third distance transform area may be associated with a third distance around the landmark, and/or so forth.

Figure 8:
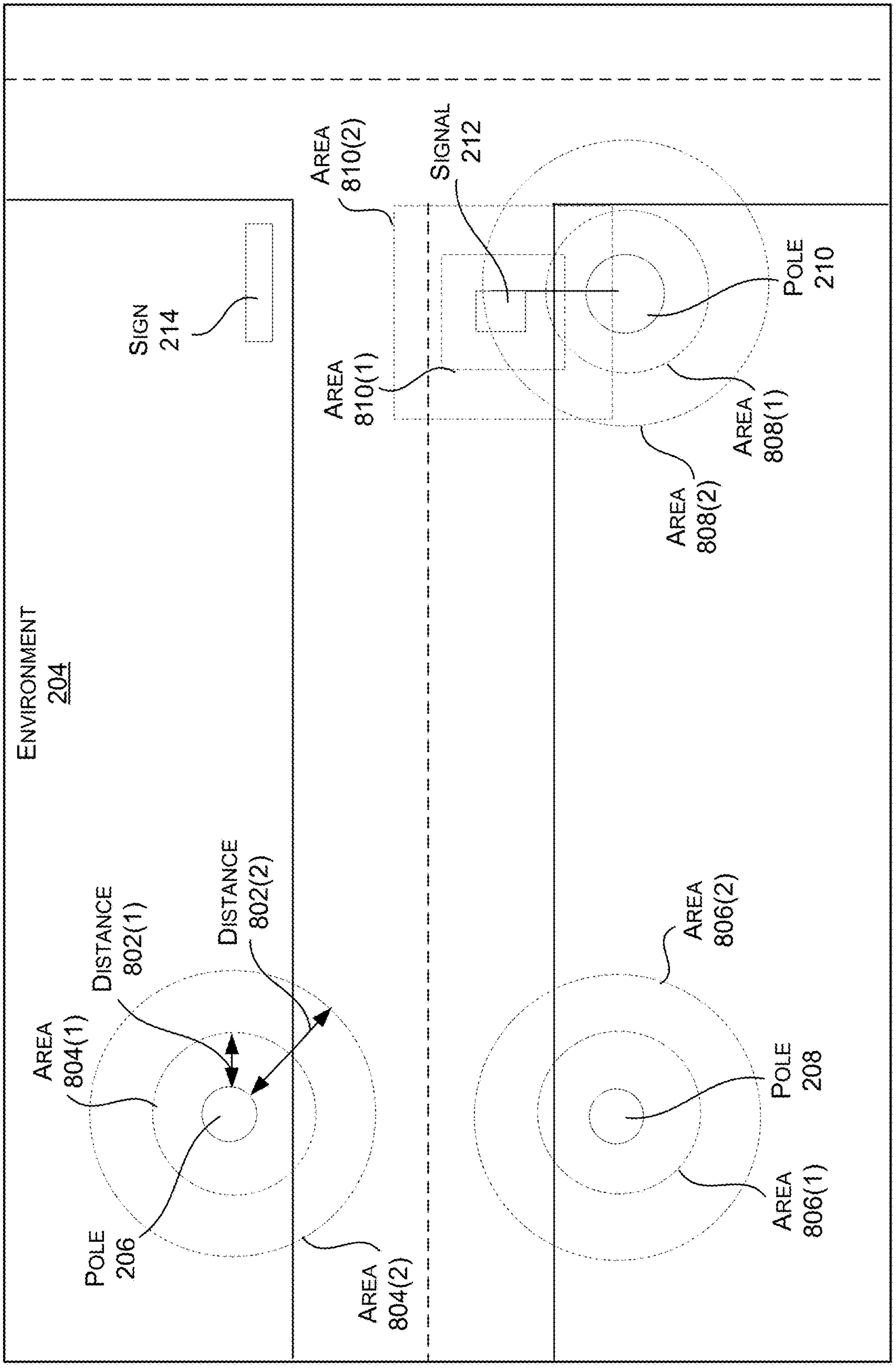
FIG. 8 illustrates an example of determining distance transform areas associated with landmarks, in accordance with some embodiments of the present disclosure.

For instance, FIG. 8 illustrates an example of determining distance transform areas associated with landmarks, in accordance with some embodiments of the present disclosure. As shown, and with regard to a landmark that includes the pole 206, the location component(s) 708 may initially use the map 602 to determine the location 302 associated with the pole 206. The location component(s) 708 may then use a first distance 802(1) to determine a first distance transform area 804(1) around the pole 206 and a second distance 802(2) to determine a second distance transform area 804(2) around the pole 206. As described herein, a distance may include, but is not limited to, 1 meter, 2 meters, 5 meters, 10 meters, and/or any other distance.

As further illustrated by the example of FIG. 8, the location component(s) 708 may perform one or more similar processes to determine distance transform areas 806(1)-(2) associated with the pole 208, distance transform areas 808(1)-(2) associated with the pole 210, and distance transform areas 810(1)-(2) associated with the traffic signal 212. However, the location component(s) 708 may not determine any distance transform areas associated with the traffic sign 214 since the traffic sign 214 is not associated with the secondary data 106. While the example of FIG. 8 illustrates using two distances to determine two distance transform areas around the locations of the landmarks, in other examples, the location component(s) 708 may use any number of distances to determine any number of distance transform areas around the landmarks.

Referring back to the example of FIG. 7, the process 700 may include the localization component(s) 702 using one or more alignment components 710 and one or more cost components 712 to determine costs associated with various poses of the machine within the environment. For instance, the alignment component(s) 710 may predict a first pose associated with the machine within the environment. Based at least on the first pose, the alignment component(s) 710 may determine first locations associated with points represented by the second data 706, such as by projecting the points into the environment. The cost component(s) 712 may then use the first locations of the points and the distance transform areas associated with the landmark(s) to determine one or more first costs associated with the first pose. As described herein, in some examples, the cost component(s) 712 may determine the first cost(s) based at least on distances between the points at the first locations and the location(s) of the landmark(s), such as by using the distance transform areas, which is described in more detail herein.

Additionally, the alignment component(s) 710 may predict a second pose associated with the machine within the environment. Based at least on the second pose, the alignment component(s) 710 may then determine second locations associated with the points represented by the second data 706, such as by projecting the points into the environment. The cost component(s) 712 may then use the second locations of the points and the distance transform areas associated with the landmark(s) to determine one or more second costs associated with the second pose. As described herein, in some examples, the cost component(s) 712 may determine the second cost(s) based at least on distances between the points at the second locations and the location(s) of the landmark(s), such as by using the distance transform areas, which is described in more detail herein. In some examples, the alignment component(s) 710 and/or the cost component(s) 712 may then continue to perform these processes to determine any number of costs associated with any number of poses.

Figure 9A:
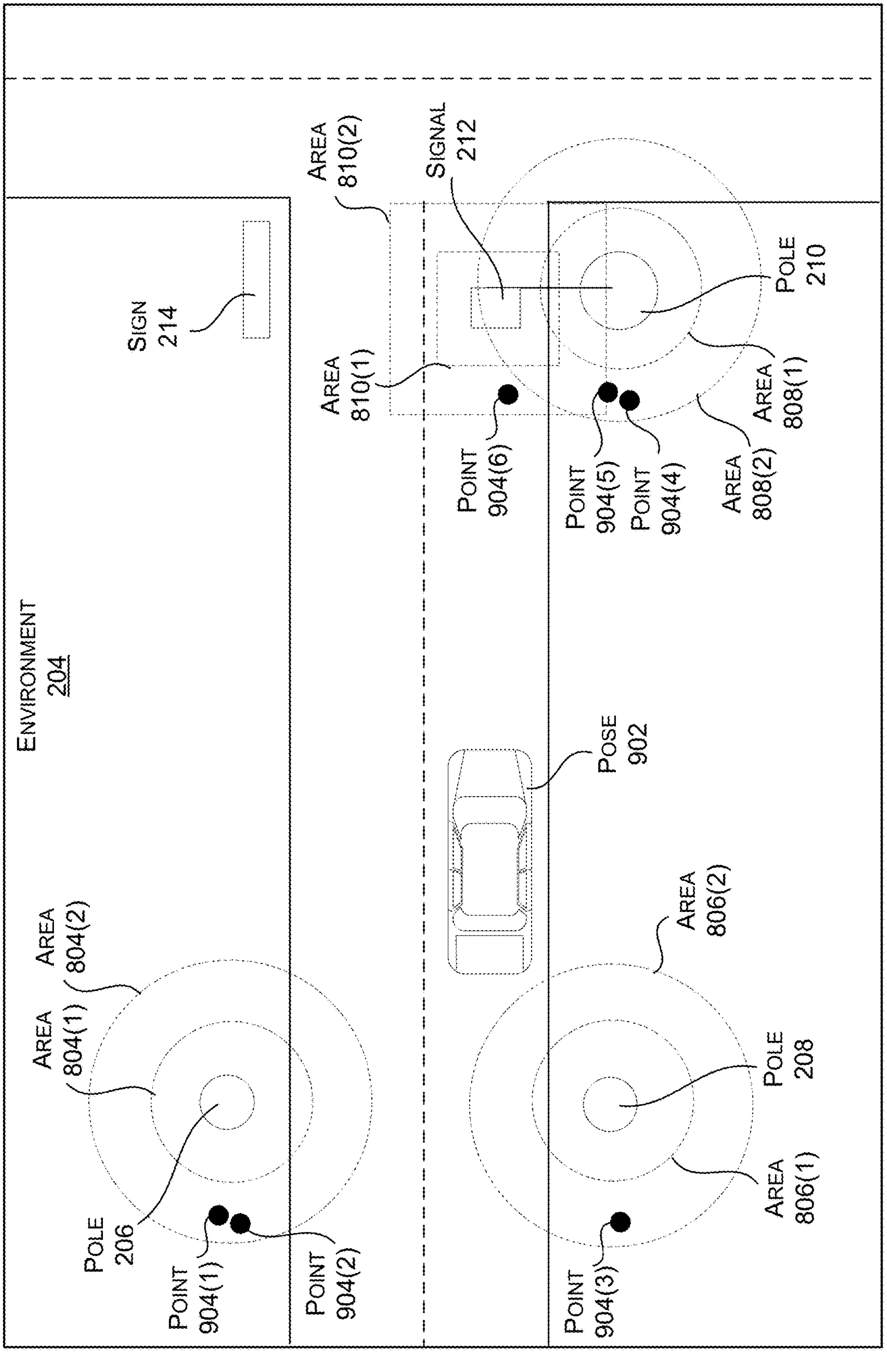
FIGS. 9A-9B illustrate examples of determining costs associated with different poses when localizing a machine, in accordance with some embodiments of the present disclosure.
Figure 9B:
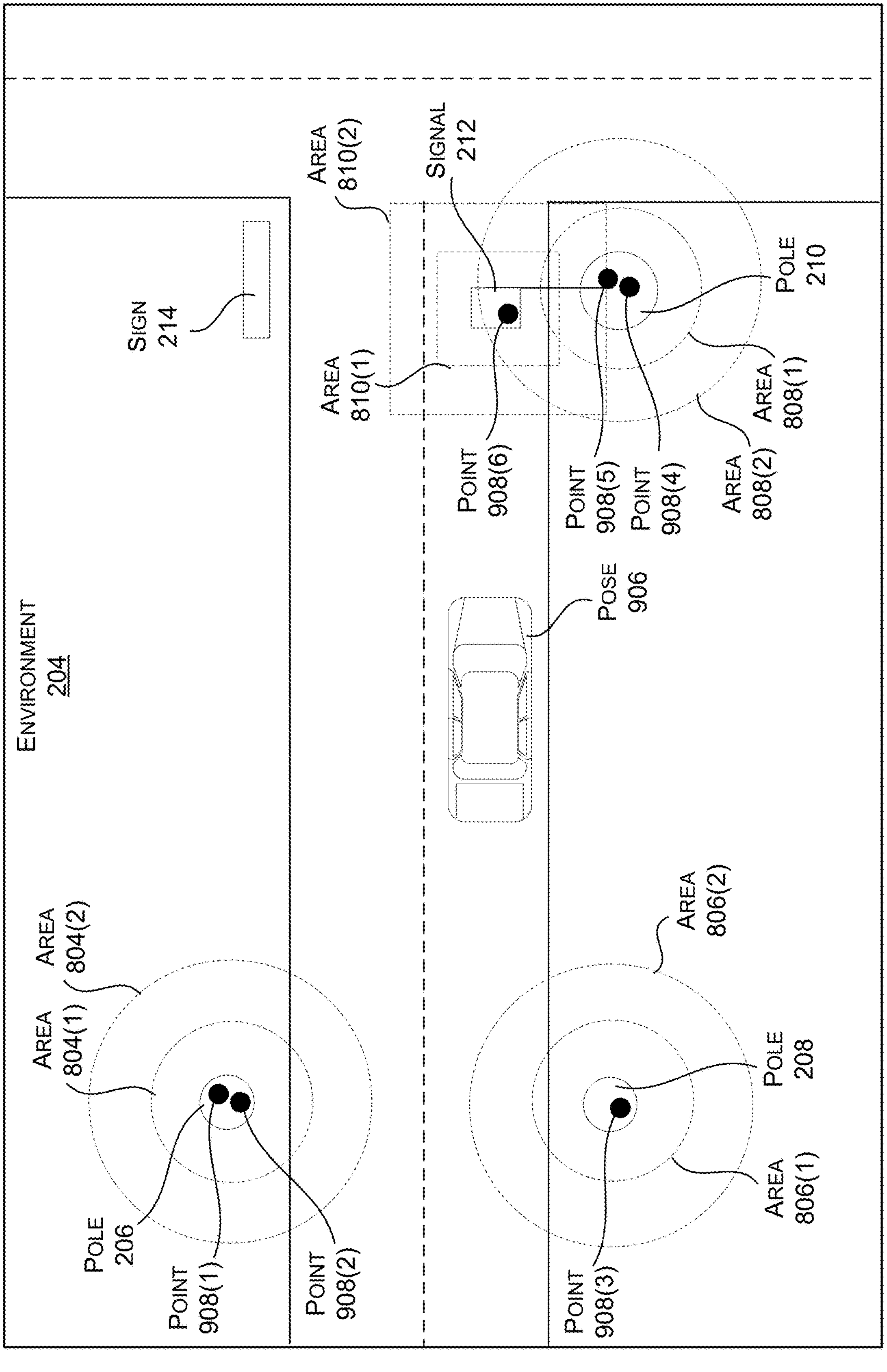

For instance, FIGS. 9A-9B illustrate examples of determining costs associated with different poses when localizing a machine, in accordance with some embodiments of the present disclosure. As shown by the example of FIG. 9A, the alignment component(s) 710 may determine a first pose 902 associated with a machine and, using the first pose 902, determine first locations 904(1)-(6) of points represented by secondary data. The cost component(s) 712 may then use the first locations 904(1)-(6) to determine one or more first costs associated with the first pose 902. As described herein, in some examples, the cost component(s) 712 may determine the first cost(s) based at least on distances between the first locations(s) 904(1)-(6) and the locations of the landmarks.

For instance, and with regard to the pole 206, the cost component(s) 712 may determine a first cost when a point is located on the pole 206, a second cost that is greater than the first cost when the point is located in the first distance transform area 804(1), a third cost that is greater than the second cost when the point is located within the second distance transform area 804(2), and a fourth cost that is greater than the third cost when the point is located outside of the second distance transform area 804(2). For example, the first cost may be zero, the second cost may be based on to the first distance 802(1) associated with the first distance transform area 804(1), the third cost may be based on the second distance 802(2) associated with the second distance transform area 804(2), and the fourth cost may be based on the second distance 802(2).

Next, and as shown by the example of FIG. 9B, the alignment component(s) 710 may determine a second pose 906 associated with the machine and, using the second pose 906, determine second locations 908(1)-(6) of points represented by the secondary data. The cost component(s) 712 may then use the second locations 908(1)-(6) to determine one or more second costs associated with the second pose 906. As described herein, in some examples, the cost component(s) 712 may determine the second cost(s) based at least on distances between the second locations 908(1)-(6) and the locations of the landmarks. As such, and in the examples of FIGS. 9A-9B, the second cost(s) may be less than the first cost(s) since the second locations 908(1)-(6) are closer to the actual locations of the landmarks as compared to the first locations 904(1)-(6). In some examples, the alignment component(s) 710 and/or the cost component(s) 712 may then continue to perform these processes to determine any number of costs associated with any number of poses for the machine.

Referring back to the example of FIG. 7, the process 700 may include the cost component(s) 712 generating and/or outputting cost data 714 representing the costs associated with the poses. The process 700 may then include the localization component(s) 702 using one or more selection components 716 to select, based at least on the cost data 714, a pose from the poses to associate with the machine. For instance, in some examples, the selection component(s) 716 may select the pose that is associated with the lowest cost. For example, and in the examples of FIGS. 9A-9B, the selection component(s) 716 may select the second pose 906 based at least on the second cost(s) being less than the first cost(s). However, in other examples, the selection component(s) 716 may perform any other technique to select a pose based at least on the costs. The process 700 may then include the selection component(s) 716 generating and/or outputting pose data 718 representing the pose associated with the machine.

In some examples, such as when the localization component(s) 702 performs localization using two or more different types of data, the localization component(s) 702 may then determine a fused pose based at least on the determined poses. For example, if the localization component(s) 702 determines both a camera-based pose and a RADAR-based pose using the camera-based map that is augmented with RADAR data, then the localization component(s) 702 may determine a fused pose based at least on the camera-based pose and the RADAR-based pose. In some examples, the localization component(s) 702 may determine the fused pose using various techniques, such as by taking the average of the poses, weighting one or more of the poses, and/or using any other technique.

Figure 10:
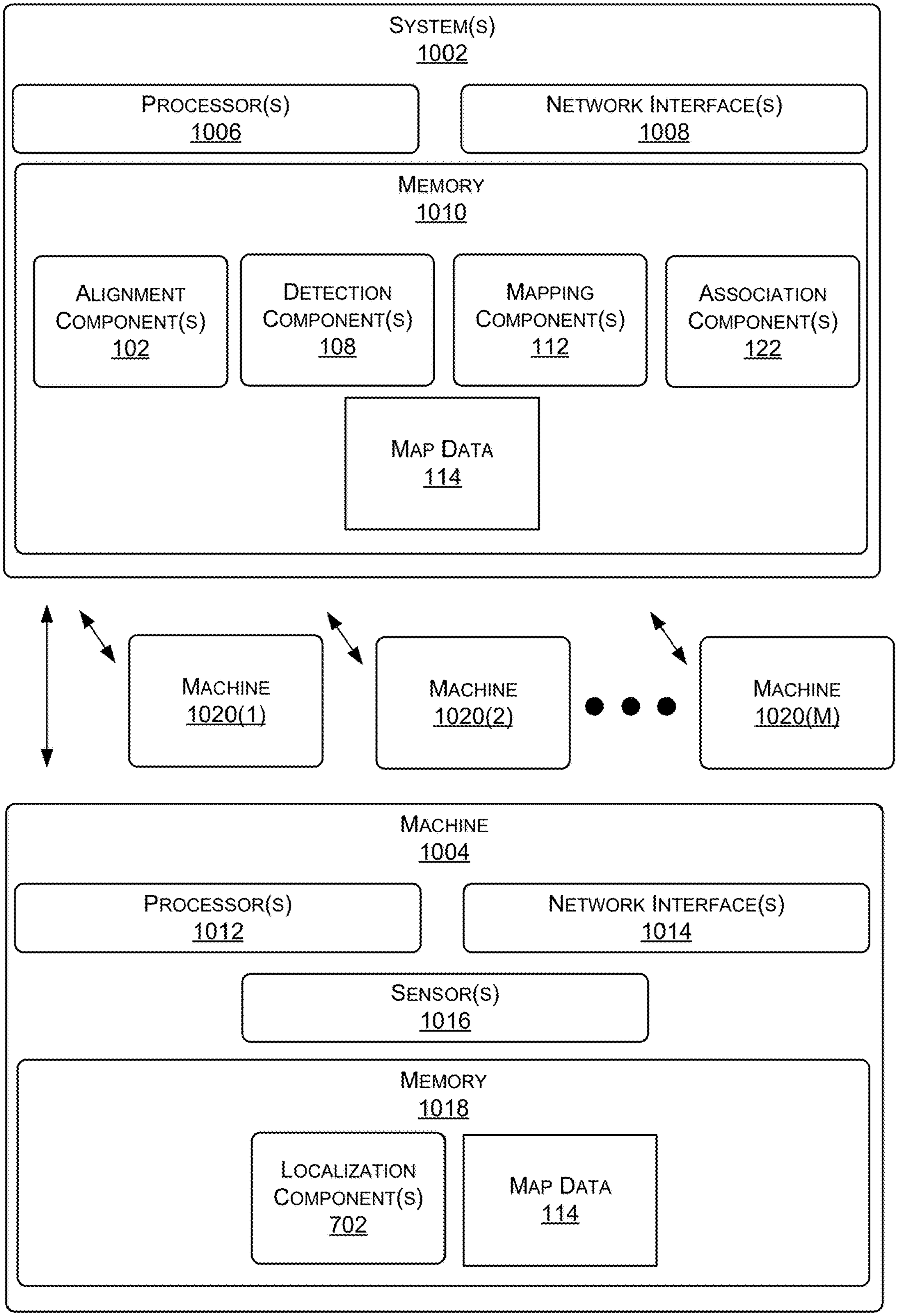
FIG. 10 illustrates an example of an architecture that may support at least a portion of the processes described herein, in accordance with some embodiments of the present disclosure.

FIG. 10 illustrates an example of an architecture that may support at least a portion of the processes described herein, in accordance with some embodiments of the present disclosure. As shown, the architecture may include at least one or more systems 1002 (which may be similar to, and/or include, an example computing device(s) 1400 and/or an example data center(s) 1500) and a machine 1004 (which may be similar to, and/or include, an example autonomous vehicle 1300). The system(s) 1002 may include at least one or more processors 1006 (which may be similar to, and/or include, a CPU(s) 1406 and/or a GPU(s) 1408), one or more network interfaces 1008 (which may be similar to, and/or include, a communication interface(s) 1412), and memory 1010 (which may be similar to, and/or include, a memory 1404). Additionally, the system(s) 1002 may store the alignment component(s) 102, the detection component(s) 108, the mapping component(s) 112, the association component(s) 122, and/or the map data 114. For instance, the system(s) 1002 may be configured to perform at least a portion of the process 100.

Additionally, the machine 1004 may include at least one or more processors 1012 (which may be similar to, and/or include, a CPU(s) 1306, a GPU(s) 1308, a processor(s) 1310, a CPU(s) 1318, and/or a GPU(s) 1320), one or more network interfaces 1014 (which may be similar to, and/or include, a network interface(s) 1324), one or more sensors 1016 (which may be similar to, and/or include, a GNSS sensor(s) 1358, a RADAR sensor(s) 1360, an ultrasonic sensor(s) 1362, a LIDAR sensor(s) 1364, an IMU sensor(s) 1366, a stereo camera(s) 1368, a wide-view camera(s) 1370, an infrared camera(s) 1372, and/or a surround camera(s) 1374), and memory 1018. As shown, the machine 1004 may further store the localization component(s) 702 and/or the map data 114. For instance, the machine 1004 may be configured to perform at least a portion of the process 700.

While the example of FIG. 10 illustrates the alignment component(s) 102, the detection component(s) 108, the mapping component(s) 112, the association component(s) 122, and the localization component(s) 702 as including software stored in memories, in other examples, the alignment component(s) 102, the detection component(s) 108, the mapping component(s) 112, the association component(s) 122, and/or the localization component(s) 702 may include any other type of component. For instance, the alignment component(s) 102, the detection component(s) 108, the mapping component(s) 112, the association component(s) 122, and/or the localization component(s) 702 may include hardware, software, modules, models, and/or any other type of component.

As further illustrated by the example of FIG. 10, the system(s) 1002 may communicate with one or more additional machines 1020(1)-(M) (which may also be similar to, and/or include, an example autonomous vehicle 1300). In some examples, the machines 1020(1)-(M) may generate and/or provide data to the system(s) 1002 for generating the maps, such as the primary data 104 and/or the secondary data 106, and/or the machine(s) 1020(1)-(M) may be similar to the machine 1004 that uses the map(s) for navigating around one or more environments.

Figure 11:
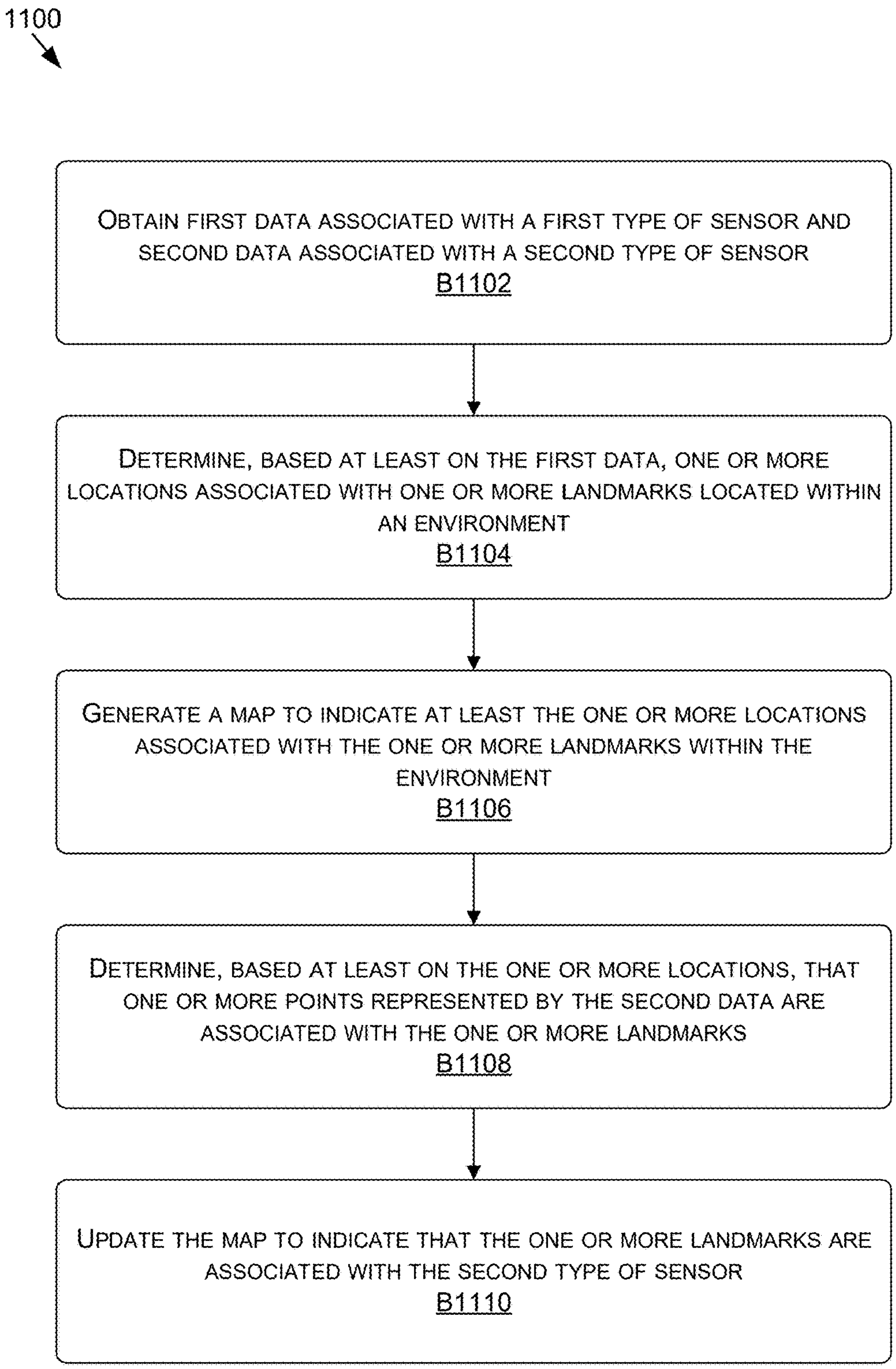
FIG. 11 illustrates a flow diagram showing a method for generating an augmented map using multiple types of sensor data, in accordance with some embodiments of the present disclosure.
Figure 12:
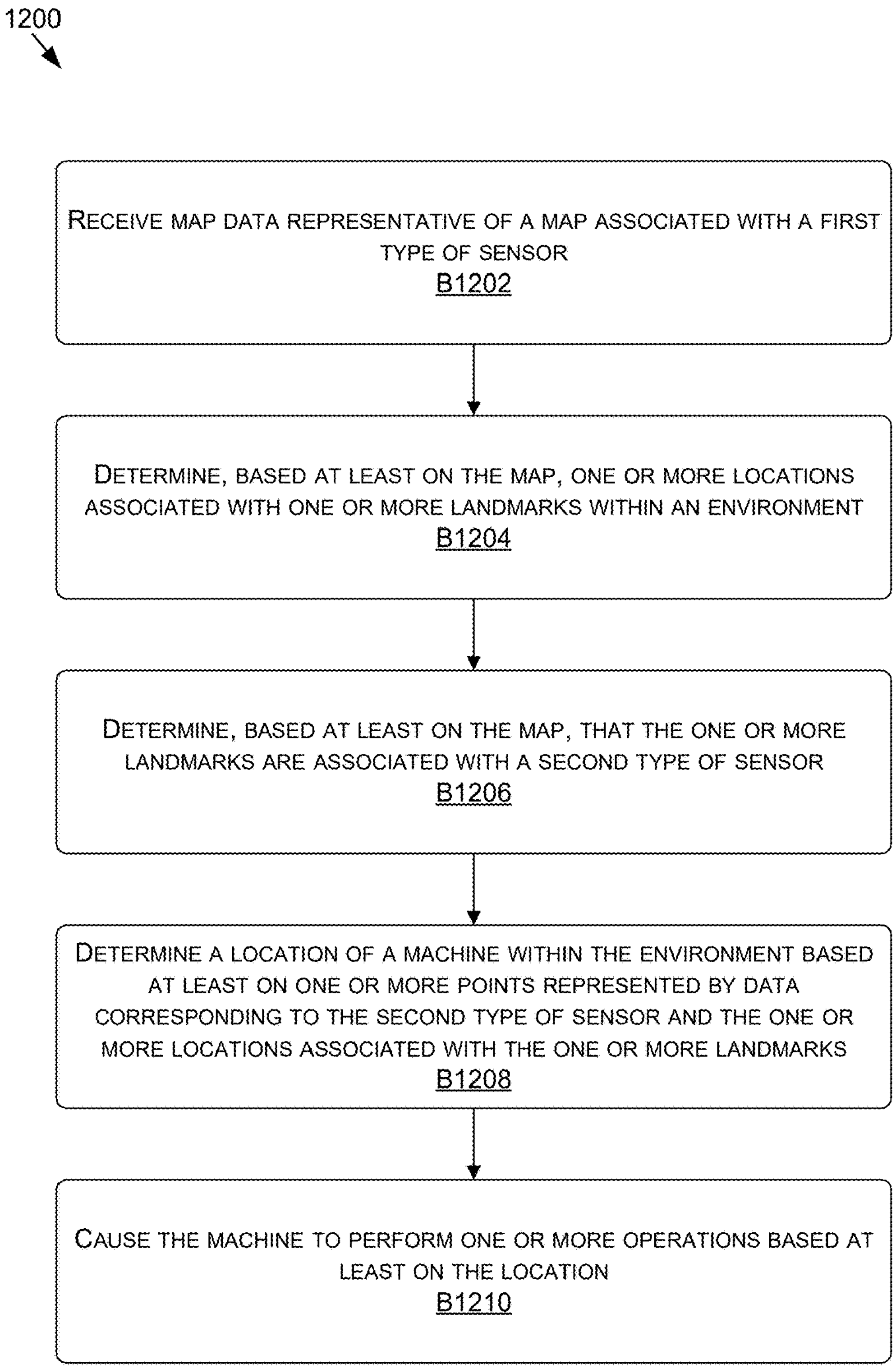
FIG. 12 illustrates a flow diagram showing a method for localizing a machine using an augmented map, in accordance with some embodiments of the present disclosure.

Now referring to FIGS. 11 and 12 each block of method 1100 and 1200, described herein, comprises a computing process that may be performed using any combination of hardware, firmware, and/or software. For instance, various functions may be carried out by a processor executing instructions stored in memory. The methods 1100 and 1200 may also be embodied as computer-usable instructions stored on computer storage media. The methods 1100 and 1200 may be provided by a standalone application, a service or hosted service (standalone or in combination with another hosted service), or a plug-in to another product, to name a few. In addition, these methods 1100 and 1200 described, by way of example, with respect to FIGS. 1 and 7. However, these methods 1100 and 1200 may additionally or alternatively be executed by any one system, or any combination of systems, including, but not limited to, those described herein.

FIG. 11 illustrates a flow diagram showing a method 1100 for generating an augmented map using multiple types of sensor data, in accordance with some embodiments of the present disclosure. The method 1100, at block B1102, may include obtaining first data associated with a first type of sensor and second data associated with a second type of sensor. For instance, the alignment component(s) 102 may receive the primary data 104 (e.g., the first data) generated using the first type of sensor and the secondary data 106 (e.g., the second data) generated using the second type of sensor. As described herein, the primary data 104 may represent first sensor data and/or first perception outputs associated with the first sensor data and the secondary data 106 may represent second sensor data and/or second perception outputs associated with the second sensor data. In some examples, the first sensor data may include image data and the second sensor data may include depth data, such as RADAR data, LiDAR data, ultrasonic data, sonar data, and/or the like.

The method 1100, at block B1104, may include determining, based at least on the first data, one or more locations associated with one or more landmarks located within the environment. For instance, the alignment component(s) 102 may align the primary data 104 with respect to the secondary data 106. The detection component(s) 108 may then process the primary data 104 and, based at least on the processing, determine the location(s) associated with the landmark(s). As described herein, in some examples, the detection component(s) 108 may use various techniques to determine the location(s), such as triangulation (and/or any other technique). In some examples, the detection component(s) 108 may determine additional information associated with the landmark(s), such as one or more classifications and/or one or more uncertainties.

The method 1100, at block B1106, may include generating a map to indicate at least the one or more locations associated with the one or more landmarks within the environment. For instance, the mapping component(s) 112 may generate the map to indicate at least the location(s) associated with the landmark(s). In some examples, the mapping component(s) 112 may generate the map to indicate additional information associated with the landmark(s), such as the classification(s).

The method 1100, at block B1108, may include determining, based at least on the one or more locations, that one or more points represented by the second data are associated with the one or more landmarks. For instance, the association component(s) 122 may determine that the point(s) is associated with the landmark(s). As described herein, the association component(s) 122 may use one or more different techniques to determine the association(s). For instance, in some examples, the association component(s) 122 may determine one or more areas within the environment that are associated with the landmark(s) and then determine that one or more 3D locations associated with the point(s) are within the area(s). For a second example, the association component(s) 122 may project the point(s) to one or more 2D locations associated with one or more sensor representations of the primary data 104 and then determine that the 2D location(s) is associated with the landmark(s).

The method 1100, at block B1110, may include updating the map to indicate that the one or more landmarks are associated with the second type of sensor. For instance, the mapping component(s) 112 may then update the map to indicate that the landmark(s) is associated with the second type of sensor (e.g., associated with sensor reflections). Additionally, in some examples, the mapping component(s) 112 may update the map to include additional information, such as one or more weights associated with the landmark(s).

FIG. 12 illustrates a flow diagram showing a method 1200 for localizing a machine using an augmented map, in accordance with some embodiments of the present disclosure. The method 1200, at block B1202, may include receiving map data representative of a map associated with a first type of sensor. For instance, the localization component(s) 702 may receive the map data 114 representing the map associated with the first type of sensor. For example, the information associated with the map, such as the locations and/or classifications associated with landmarks, may be determined using sensor data generated using the first type of sensor. Additionally, as described herein, the map may be augmented with information associated with a second type of sensor. For example, the map may include a camera-based map that is augmented using RADAR data.

The method 1200, at block B1204, may include determining, based at least on the map, one or more locations associated with one or more landmarks within an environment and the method 1200, at block B1206, may include determining, based at least on the map, that the one or more landmarks are associated with a second type of sensor. For instance, the localization component(s) 702 may determine the location(s) of the landmark(s) using the map, such as the information determined using the first type of sensor. Additionally, the localization component(s) 702 may determine that the landmark(s) is associated with the second type of sensor. For example, the map may indicate that the landmark(s) is associated with sensor reflections, such as RADAR reflections.

The method 1200, at block B1208, may include determining a location associated with a machine within the environment based at least on one or more points represented by data corresponding to the second type of sensor and the one or more locations associated with the one or more landmarks. For instance, the localization component(s) 702 may determine the location associated with the machine based at least on the point(s) represented by the second data 706 and the location(s) associated with the landmark(s). As described herein, in some examples, the second data 706 may include sensor data generated using the second type of sensor and/or perception outputs associated with the sensor data. Additionally, in some examples, the localization component(s) 702 may use various techniques to determine the location, such as by using one or more costs associated with one or more poses of the machine within the environment.

The method 1200, at block B1210, may include causing the machine to perform one or more operations based at least on the location. For instance, the localization component(s) 702 may cause the machine to perform the operation(s) based at least on the location. As described herein, the operation(s) may include any type of operation, such as navigating along a determined path, safely coming to a stop, and/or any other operation.

Example Autonomous Vehicle

Figure 13A:
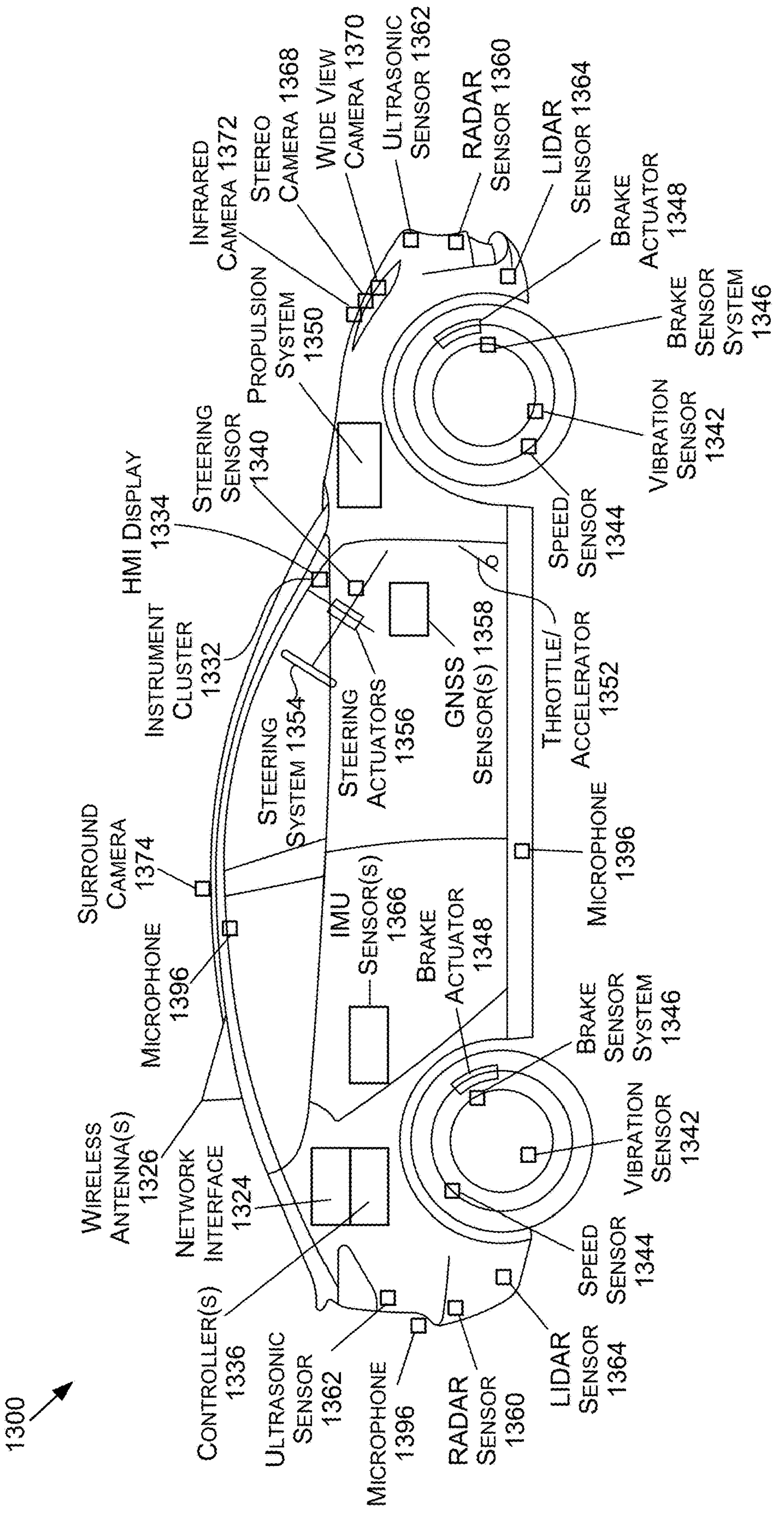
FIG. 13A is an illustration of an example autonomous vehicle, in accordance with some embodiments of the present disclosure.

FIG. 13A is an illustration of an example autonomous vehicle 1300, in accordance with some embodiments of the present disclosure. The autonomous vehicle 1300 (alternatively referred to herein as the "vehicle 1300") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1300 may be capable of functionality in accordance with one or more of Level 3-Level 5 of the autonomous driving levels. The vehicle 1300 may be capable of functionality in accordance with one or more of Level 1-Level 5 of the autonomous driving levels. For example, the vehicle 1300 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1300 or other machine, such as being fully autonomous, being highly autonomous, being conditionally autonomous, being partially autonomous, providing assistive autonomy, being semi-autonomous, being primarily autonomous, or other designation.

The vehicle 1300 may include components such as a chassis, a vehicle body, wheels (e.g., 2, 4, 6, 8, 18, etc.), tires, axles, and other components of a vehicle. The vehicle 1300 may include a propulsion system 1350, such as an internal combustion engine, hybrid electric power plant, an all-electric engine, and/or another propulsion system type. The propulsion system 1350 may be connected to a drive train of the vehicle 1300, which may include a transmission, to enable the propulsion of the vehicle 1300. The propulsion system 1350 may be controlled in response to receiving signals from the throttle/accelerator 1352.

A steering system 1354, which may include a steering wheel, may be used to steer the vehicle 1300 (e.g., along a desired path or route) when the propulsion system 1350 is operating (e.g., when the vehicle is in motion). The steering system 1354 may receive signals from a steering actuator 1356. The steering wheel may be optional for full automation (Level 5) functionality.

The brake sensor system 1346 may be used to operate the vehicle brakes in response to receiving signals from the brake actuators 1348 and/or brake sensors.

Controller(s) 1336, which may include one or more system on chips (SoCs) 1304 (FIG. 13C) and/or GPU(s), may provide signals (e.g., representative of commands) to one or more components and/or systems of the vehicle 1300. For example, the controller(s) may send signals to operate the vehicle brakes via one or more brake actuators 1348, to operate the steering system 1354 via one or more steering actuators 1356, to operate the propulsion system 1350 via one or more throttle/accelerators 1352. The controller(s) 1336 may include one or more onboard (e.g., integrated) computing devices (e.g., supercomputers) that process sensor signals, and output operation commands (e.g., signals representing commands) to enable autonomous driving and/or to assist a human driver in driving the vehicle 1300. The controller(s) 1336 may include a first controller 1336 for autonomous driving functions, a second controller 1336 for functional safety functions, a third controller 1336 for artificial intelligence functionality (e.g., computer vision), a fourth controller 1336 for infotainment functionality, a fifth controller 1336 for redundancy in emergency conditions, and/or other controllers. In some examples, a single controller 1336 may handle two or more of the above functionalities, two or more controllers 1336 may handle a single functionality, and/or any combination thereof.

The controller(s) 1336 may provide the signals for controlling one or more components and/or systems of the vehicle 1300 in response to sensor data received from one or more sensors (e.g., sensor inputs). The sensor data may be received from, for example and without limitation, global navigation satellite systems ("GNSS") sensor(s) 1358 (e.g., Global Positioning System sensor(s)), RADAR sensor(s) 1360, ultrasonic sensor(s) 1362, LIDAR sensor(s) 1364, inertial measurement unit (IMU) sensor(s) 1366 (e.g., accelerometer(s), gyroscope(s), magnetic compass(es), magnetometer(s), etc.), microphone(s) 1396, stereo camera(s) 1368, wide-view camera(s) 1370 (e.g., fisheye cameras), infrared camera(s) 1372, surround camera(s) 1374 (e.g., 360 degree cameras), long-range and/or mid-range camera(s) 1398, speed sensor(s) 1344 (e.g., for measuring the speed of the vehicle 1300), vibration sensor(s) 1342, steering sensor(s) 1340, brake sensor(s) (e.g., as part of the brake sensor system 1346), and/or other sensor types.

One or more of the controller(s) 1336 may receive inputs (e.g., represented by input data) from an instrument cluster 1332 of the vehicle 1300 and provide outputs (e.g., represented by output data, display data, etc.) via a human-machine interface (HMI) display 1334, an audible annunciator, a loudspeaker, and/or via other components of the vehicle 1300. The outputs may include information such as vehicle velocity, speed, time, map data (e.g., the High Definition ("HD") map 1322 of FIG. 13C), location data (e.g., the vehicle's 1300 location, such as on a map), direction, location of other vehicles (e.g., an occupancy grid), information about objects and status of objects as perceived by the controller(s) 1336, etc. For example, the HMI display 1334 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1300 further includes a network interface 1324 which may use one or more wireless antenna(s) 1326 and/or modem(s) to communicate over one or more networks. For example, the network interface 1324 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1326 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 13B:
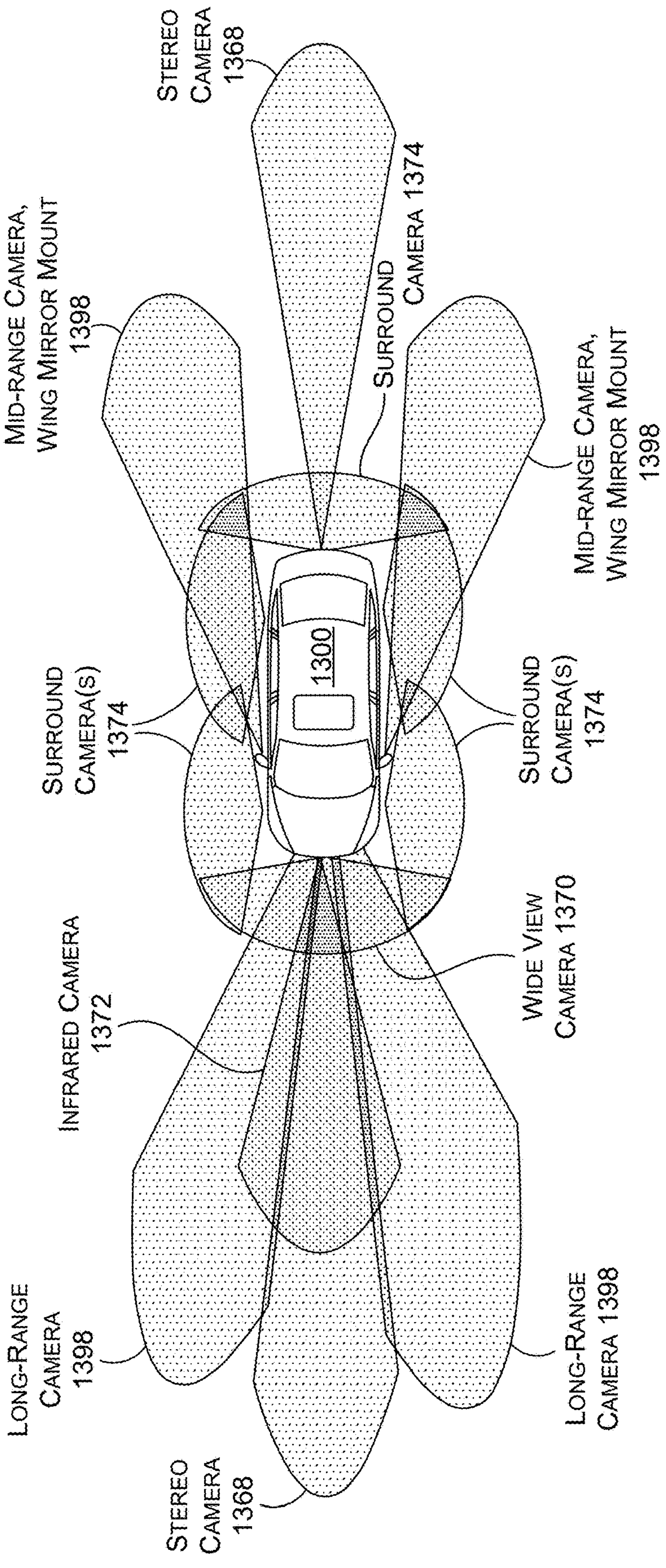
FIG. 13B is an example of camera locations and fields of view for the example autonomous vehicle of FIG. 13A, in accordance with some embodiments of the present disclosure.

FIG. 13B is an example of camera locations and fields of view for the example autonomous vehicle 1300 of FIG. 13A, in accordance with some embodiments of the present disclosure. The cameras and respective fields of view are one example embodiment and are not intended to be limiting. For example, additional and/or alternative cameras may be included and/or the cameras may be located at different locations on the vehicle 1300.

The camera types for the cameras may include, but are not limited to, digital cameras that may be adapted for use with the components and/or systems of the vehicle 1300. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1300 (e.g., front-facing cameras) may be used for surround view, to help identify forward facing paths and obstacles, as well aid in, with the help of one or more controllers 1336 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 1370 that may be used to perceive objects coming into view from the periphery (e.g., pedestrians, crossing traffic or bicycles). Although only one wide-view camera is illustrated in FIG. 13B, there may be any number (including zero) of wide-view cameras 1370 on the vehicle 1300. In addition, any number of long-range camera(s) 1398 (e.g., a long-view stereo camera pair) may be used for depth-based object detection, especially for objects for which a neural network has not yet been trained. The long-range camera(s) 1398 may also be used for object detection and classification, as well as basic object tracking.

Any number of stereo cameras 1368 may also be included in a front-facing configuration. In at least one embodiment, one or more of stereo camera(s) 1368 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1368 may include a compact stereo vision sensor (s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1368 may be used in addition to, or alternatively from, those described herein.

Cameras with a field of view that include portions of the environment to the side of the vehicle 1300 (e.g., side-view cameras) may be used for surround view, providing information used to create and update the occupancy grid, as well as to generate side impact collision warnings. For example, surround camera(s) 1374 (e.g., four surround cameras 1374 as illustrated in FIG. 13B) may be positioned to on the vehicle 1300. The surround camera(s) 1374 may include wide-view camera(s) 1370, fisheye camera(s), 360 degree camera(s), and/or the like. Four example, four fisheye cameras may be positioned on the vehicle's front, rear, and sides. In an alternative arrangement, the vehicle may use three surround camera(s) 1374 (e.g., left, right, and rear), and may leverage one or more other camera(s) (e.g., a forward-facing camera) as a fourth surround view camera.

Cameras with a field of view that include portions of the environment to the rear of the vehicle 1300 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1398, stereo camera(s) 1368), infrared camera(s) 1372, etc.), as described herein.

Figure 13C:
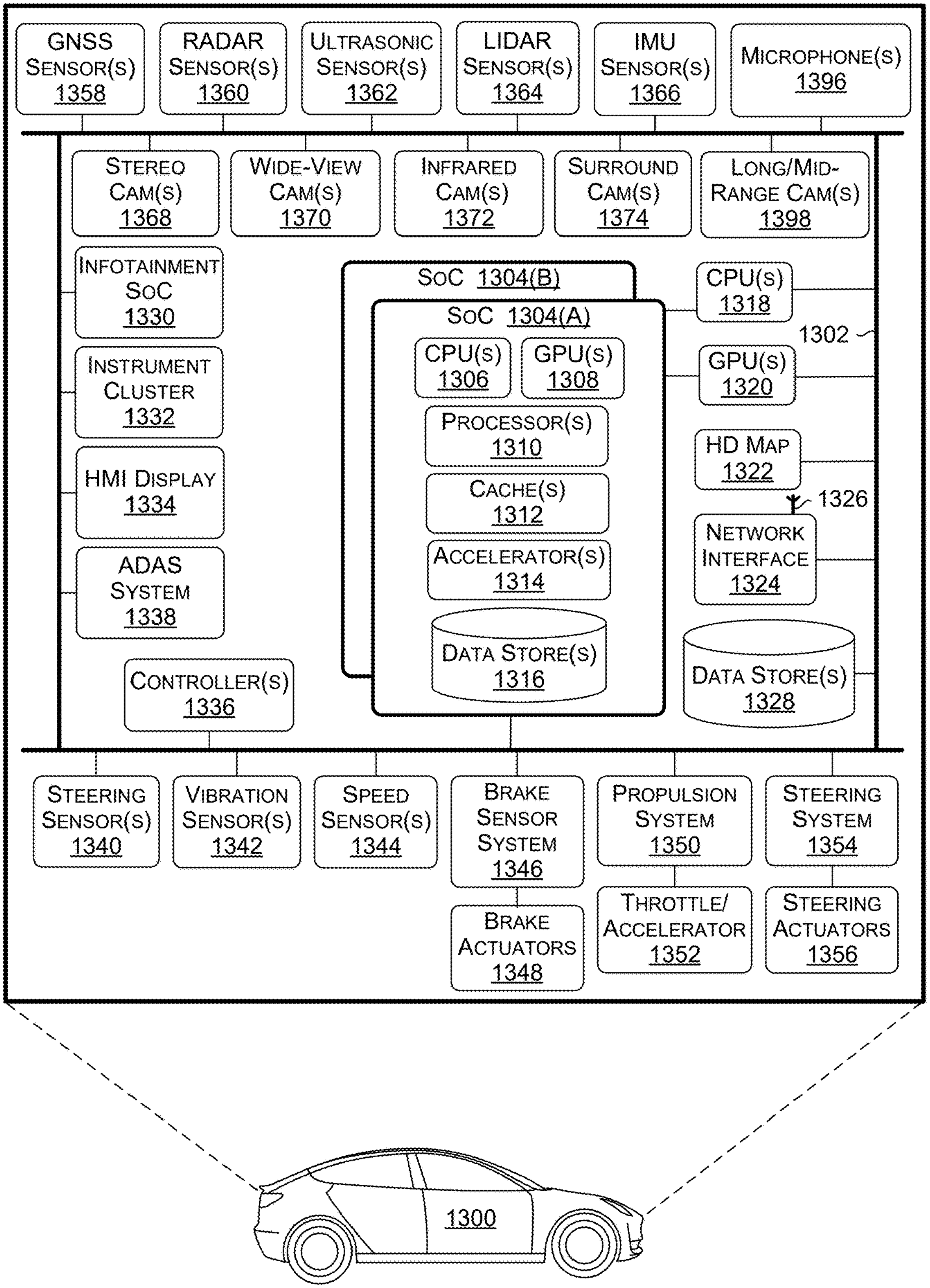
FIG. 13C is a block diagram of an example system architecture for the example autonomous vehicle of FIG. 13A, in accordance with some embodiments of the present disclosure.

FIG. 13C is a block diagram of an example system architecture for the example autonomous vehicle 1300 of FIG. 13A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1300 in FIG. 13C are illustrated as being connected via bus 1302. The bus 1302 may include a Controller Area Network (CAN) data interface (alternatively referred to herein as a "CAN bus"). A CAN may be a network inside the vehicle 1300 used to aid in control of various features and functionality of the vehicle 1300, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1302 is described herein as being a CAN bus, this is not intended to be limiting. For example, in addition to, or alternatively from, the CAN bus, FlexRay and/or Ethernet may be used. Additionally, although a single line is used to represent the bus 1302, this is not intended to be limiting. For example, there may be any number of busses 1302, which may include one or more CAN busses, one or more FlexRay busses, one or more Ethernet busses, and/or one or more other types of busses using a different protocol. In some examples, two or more busses 1302 may be used to perform different functions, and/or may be used for redundancy. For example, a first bus 1302 may be used for collision avoidance functionality and a second bus 1302 may be used for actuation control. In any example, each bus 1302 may communicate with any of the components of the vehicle 1300, and two or more busses 1302 may communicate with the same components. In some examples, each SoC 1304, each controller 1336, and/or each computer within the vehicle may have access to the same input data (e.g., inputs from sensors of the vehicle 1300), and may be connected to a common bus, such the CAN bus.

The vehicle 1300 may include one or more controller(s) 1336, such as those described herein with respect to FIG. 13A. The controller(s) 1336 may be used for a variety of functions. The controller(s) 1336 may be coupled to any of the various other components and systems of the vehicle 1300, and may be used for control of the vehicle 1300, artificial intelligence of the vehicle 1300, infotainment for the vehicle 1300, and/or the like.

The vehicle 1300 may include a system(s) on a chip (SoC) 1304. The SoC 1304 may include CPU(s) 1306, GPU(s) 1308, processor(s) 1310, cache(s) 1312, accelerator(s) 1314, data store(s) 1316, and/or other components and features not illustrated. The SoC(s) 1304 may be used to control the vehicle 1300 in a variety of platforms and systems. For example, the SoC(s) 1304 may be combined in a system (e.g., the system of the vehicle 1300) with an HD map 1322 which may obtain map refreshes and/or updates via a network interface 1324 from one or more servers (e.g., server(s) 1378 of FIG. 13D).

The CPU(s) 1306 may include a CPU cluster or CPU complex (alternatively referred to herein as a "CCPLEX"). The CPU(s) 1306 may include multiple cores and/or L2 caches. For example, in some embodiments, the CPU(s) 1306 may include eight cores in a coherent multi-processor configuration. In some embodiments, the CPU(s) 1306 may include four dual-core clusters where each cluster has a dedicated L2 cache (e.g., a 2 MB L2 cache). The CPU(s) 1306 (e.g., the CCPLEX) may be configured to support simultaneous cluster operation enabling any combination of the clusters of the CPU(s) 1306 to be active at any given time.

The CPU(s) 1306 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1306 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1308 may include an integrated GPU (alternatively referred to herein as an "iGPU"). The GPU(s) 1308 may be programmable and may be efficient for parallel workloads. The GPU(s) 1308, in some examples, may use an enhanced tensor instruction set. The GPU(s) 1308 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1308 may include at least eight streaming microprocessors. The GPU(s) 1308 may use compute application programming interface(s) (API(s)). In addition, the GPU(s) 1308 may use one or more parallel computing platforms and/or programming models (e.g., NVIDIA's CUDA).

The GPU(s) 1308 may be power-optimized for best performance in automotive and embedded use cases. For example, the GPU(s) 1308 may be fabricated on a Fin field-effect transistor (FinFET). However, this is not intended to be limiting and the GPU(s) 1308 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1308 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1308 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1308 to access the CPU(s) 1306 page tables directly. In such examples, when the GPU(s) 1308 memory management unit (MMU) experiences a miss, an address translation request may be transmitted to the CPU(s) 1306. In response, the CPU(s) 1306 may look in its page tables for the virtual-to-physical mapping for the address and transmits the translation back to the GPU(s) 1308. As such, unified memory technology may allow a single unified virtual address space for memory of both the CPU(s) 1306 and the GPU(s) 1308, thereby simplifying the GPU(s) 1308 programming and porting of applications to the GPU(s) 1308.

In addition, the GPU(s) 1308 may include an access counter that may keep track of the frequency of access of the GPU(s) 1308 to memory of other processors. The access counter may help ensure that memory pages are moved to the physical memory of the processor that is accessing the pages most frequently.

The SoC(s) 1304 may include any number of cache(s) 1312, including those described herein. For example, the cache(s) 1312 may include an L3 cache that is available to both the CPU(s) 1306 and the GPU(s) 1308 (e.g., that is connected both the CPU(s) 1306 and the GPU(s) 1308). The cache(s) 1312 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1304 may include an arithmetic logic unit(s) (ALU(s)) which may be leveraged in performing processing with respect to any of the variety of tasks or operations of the vehicle 1300—such as processing DNNs. In addition, the SoC(s) 1304 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1306 and/or GPU(s) 1308.

The SoC(s) 1304 may include one or more accelerators 1314 (e.g., hardware accelerators, software accelerators, or a combination thereof). For example, the SoC(s) 1304 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1308 and to off-load some of the tasks of the GPU(s) 1308 (e.g., to free up more cycles of the GPU(s) 1308 for performing other tasks). As an example, the accelerator(s) 1314 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1314 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1308, and by using an inference accelerator, for example, a designer may target either the DLA(s) or the GPU(s) 1308 for any function. For example, the designer may focus processing of CNNs and floating point operations on the DLA(s) and leave other functions to the GPU(s) 1308 and/or other accelerator(s) 1314.

The accelerator(s) 1314 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1306. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1314 (e.g., the hardware acceleration cluster) may include a computer vision network on-chip and SRAM, for providing a high-bandwidth, low latency SRAM for the accelerator(s) 1314. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1304 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1314 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1366 output that correlates with the vehicle 1300 orientation, distance, 3D location estimates of the object obtained from the neural network and/or other sensors (e.g., LIDAR sensor(s) 1364 or RADAR sensor(s) 1360), among others.

The SoC(s) 1304 may include data store(s) 1316 (e.g., memory). The data store(s) 1316 may be on-chip memory of the SoC(s) 1304, which may store neural networks to be executed on the GPU and/or the DLA. In some examples, the data store(s) 1316 may be large enough in capacity to store multiple instances of neural networks for redundancy and safety. The data store(s) 1312 may comprise L2 or L3 cache(s) 1312. Reference to the data store(s) 1316 may include reference to the memory associated with the PVA, DLA, and/or other accelerator(s) 1314, as described herein.

The SoC(s) 1304 may include one or more processor(s) 1310 (e.g., embedded processors). The processor(s) 1310 may include a boot and power management processor that may be a dedicated processor and subsystem to handle boot power and management functions and related security enforcement. The boot and power management processor may be a part of the SoC(s) 1304 boot sequence and may provide runtime power management services. The boot power and management processor may provide clock and voltage programming, assistance in system low power state transitions, management of SoC(s) 1304 thermals and temperature sensors, and/or management of the SoC(s) 1304 power states. Each temperature sensor may be implemented as a ring-oscillator whose output frequency is proportional to temperature, and the SoC(s) 1304 may use the ring-oscillators to detect temperatures of the CPU(s) 1306, GPU(s) 1308, and/or accelerator(s) 1314. If temperatures are determined to exceed a threshold, the boot and power management processor may enter a temperature fault routine and put the SoC(s) 1304 into a lower power state and/or put the vehicle 1300 into a chauffeur to safe stop mode (e.g., bring the vehicle 1300 to a safe stop).

The processor(s) 1310 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1310 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1310 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1310 may further include a real-time camera engine that may include a dedicated processor subsystem for handling real-time camera management.

The processor(s) 1310 may further include a high-dynamic range signal processor that may include an image signal processor that is a hardware engine that is part of the camera processing pipeline.

The processor(s) 1310 may include a video image compositor that may be a processing block (e.g., implemented on a microprocessor) that implements video post-processing functions needed by a video playback application to produce the final image for the player window. The video image compositor may perform lens distortion correction on wide-view camera(s) 1370, surround camera(s) 1374, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1308 is not required to continuously render new surfaces. Even when the GPU(s) 1308 is powered on and active doing 3D rendering, the video image compositor may be used to offload the GPU(s) 1308 to improve performance and responsiveness.

The SoC(s) 1304 may further include a mobile industry processor interface (MIPI) camera serial interface for receiving video and input from cameras, a high-speed interface, and/or a video input block that may be used for camera and related pixel input functions. The SoC(s) 1304 may further include an input/output controller(s) that may be controlled by software and may be used for receiving I/O signals that are uncommitted to a specific role.

The SoC(s) 1304 may further include a broad range of peripheral interfaces to enable communication with peripherals, audio codecs, power management, and/or other devices. The SoC(s) 1304 may be used to process data from cameras (e.g., connected over Gigabit Multimedia Serial Link and Ethernet), sensors (e.g., LIDAR sensor(s) 1364, RADAR sensor(s) 1360, etc. that may be connected over Ethernet), data from bus 1302 (e.g., speed of vehicle 1300, steering wheel position, etc.), data from GNSS sensor(s) 1358 (e.g., connected over Ethernet or CAN bus). The SoC(s) 1304 may further include dedicated high-performance mass storage controllers that may include their own DMA engines, and that may be used to free the CPU(s) 1306 from routine data management tasks.

The SoC(s) 1304 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1304 may be faster, more reliable, and even more energy-efficient and space-efficient than conventional systems. For example, the accelerator(s) 1314, when combined with the CPU(s) 1306, the GPU(s) 1308, and the data store(s) 1316, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1320) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1308.

In some examples, a CNN for facial recognition and vehicle owner identification may use data from camera sensors to identify the presence of an authorized driver and/or owner of the vehicle 1300. The always on sensor processing engine may be used to unlock the vehicle when the owner approaches the driver door and turn on the lights, and, in security mode, to disable the vehicle when the owner leaves the vehicle. In this way, the SoC(s) 1304 provide for security against theft and/or carjacking.

In another example, a CNN for emergency vehicle detection and identification may use data from microphones 1396 to detect and identify emergency vehicle sirens. In contrast to conventional systems, that use general classifiers to detect sirens and manually extract features, the SoC(s) 1304 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1358. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1362, until the emergency vehicle(s) passes.

The vehicle may include a CPU(s) 1318 (e.g., discrete CPU(s), or dCPU(s)), that may be coupled to the SoC(s) 1304 via a high-speed interconnect (e.g., PCIe). The CPU(s) 1318 may include an X86 processor, for example. The CPU(s) 1318 may be used to perform any of a variety of functions, including arbitrating potentially inconsistent results between ADAS sensors and the SoC(s) 1304, and/or monitoring the status and health of the controller(s) 1336 and/or infotainment SoC 1330, for example.

The vehicle 1300 may include a GPU(s) 1320 (e.g., discrete GPU(s), or dGPU(s)), that may be coupled to the SoC(s) 1304 via a high-speed interconnect (e.g., NVIDIA's NVLINK). The GPU(s) 1320 may provide additional artificial intelligence functionality, such as by executing redundant and/or different neural networks, and may be used to train and/or update neural networks based on input (e.g., sensor data) from sensors of the vehicle 1300.

The vehicle 1300 may further include the network interface 1324 which may include one or more wireless antennas 1326 (e.g., one or more wireless antennas for different communication protocols, such as a cellular antenna, a Bluetooth antenna, etc.). The network interface 1324 may be used to enable wireless connectivity over the Internet with the cloud (e.g., with the server(s) 1378 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1300 information about vehicles in proximity to the vehicle 1300 (e.g., vehicles in front of, on the side of, and/or behind the vehicle 1300). This functionality may be part of a cooperative adaptive cruise control functionality of the vehicle 1300.

The network interface 1324 may include a SoC that provides modulation and demodulation functionality and enables the controller(s) 1336 to communicate over wireless networks. The network interface 1324 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1300 may further include data store(s) 1328 which may include off-chip (e.g., off the SoC(s) 1304) storage. The data store(s) 1328 may include one or more storage elements including RAM, SRAM, DRAM, VRAM, Flash, hard disks, and/or other components and/or devices that may store at least one bit of data.

The vehicle 1300 may further include GNSS sensor(s) 1358. The GNSS sensor(s) 1358 (e.g., GPS, assisted GPS sensors, differential GPS (DGPS) sensors, etc.), to assist in mapping, perception, occupancy grid generation, and/or path planning functions. Any number of GNSS sensor(s) 1358 may be used, including, for example and without limitation, a GPS using a USB connector with an Ethernet to Serial (RS-232) bridge.

The vehicle 1300 may further include RADAR sensor(s) 1360. The RADAR sensor(s) 1360 may be used by the vehicle 1300 for long-range vehicle detection, even in darkness and/or severe weather conditions. RADAR functional safety levels may be ASIL B. The RADAR sensor(s) 1360 may use the CAN and/or the bus 1302 (e.g., to transmit data generated by the RADAR sensor(s) 1360) for control and to access object tracking data, with access to Ethernet to access raw data in some examples. A wide variety of RADAR sensor types may be used. For example, and without limitation, the RADAR sensor(s) 1360 may be suitable for front, rear, and side RADAR use. In some example, Pulse Doppler RADAR sensor(s) are used.

The RADAR sensor(s) 1360 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1360 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1300 surroundings at higher speeds with minimal interference from traffic in adjacent lanes. The other two antennae may expand the field of view, making it possible to quickly detect vehicles entering or leaving the vehicle's 1300 lane.

Mid-range RADAR systems may include, as an example, a range of up to 1360 m (front) or 80 m (rear), and a field of view of up to 42 degrees (front) or 1350 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1300 may further include ultrasonic sensor(s) 1362. The ultrasonic sensor(s) 1362, which may be positioned at the front, back, and/or the sides of the vehicle 1300, may be used for park assist and/or to create and update an occupancy grid. A wide variety of ultrasonic sensor(s) 1362 may be used, and different ultrasonic sensor(s) 1362 may be used for different ranges of detection (e.g., 2.5 m, 4 m). The ultrasonic sensor(s) 1362 may operate at functional safety levels of ASIL B.

The vehicle 1300 may include LIDAR sensor(s) 1364. The LIDAR sensor(s) 1364 may be used for object and pedestrian detection, emergency braking, collision avoidance, and/or other functions. The LIDAR sensor(s) 1364 may be functional safety level ASIL B. In some examples, the vehicle 1300 may include multiple LIDAR sensors 1364 (e.g., two, four, six, etc.) that may use Ethernet (e.g., to provide data to a Gigabit Ethernet switch).

In some examples, the LIDAR sensor(s) 1364 may be capable of providing a list of objects and their distances for a 360-degree field of view. Commercially available LIDAR sensor(s) 1364 may have an advertised range of approximately 1300 m, with an accuracy of 2 cm-3 cm, and with support for a 1300 Mbps Ethernet connection, for example. In some examples, one or more non-protruding LIDAR sensors 1364 may be used. In such examples, the LIDAR sensor(s) 1364 may be implemented as a small device that may be embedded into the front, rear, sides, and/or corners of the vehicle 1300. The LIDAR sensor(s) 1364, in such examples, may provide up to a 120-degree horizontal and 35-degree vertical field-of-view, with a 200 m range even for low-reflectivity objects. Front-mounted LIDAR sensor(s) 1364 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1300. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1364 may be less susceptible to motion blur, vibration, and/or shock.

The vehicle may further include IMU sensor(s) 1366. The IMU sensor(s) 1366 may be located at a center of the rear axle of the vehicle 1300, in some examples. The IMU sensor(s) 1366 may include, for example and without limitation, an accelerometer(s), a magnetometer(s), a gyroscope(s), a magnetic compass(es), and/or other sensor types. In some examples, such as in six-axis applications, the IMU sensor(s) 1366 may include accelerometers and gyroscopes, while in nine-axis applications, the IMU sensor(s) 1366 may include accelerometers, gyroscopes, and magnetometers.

In some embodiments, the IMU sensor(s) 1366 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1366 may enable the vehicle 1300 to estimate heading without requiring input from a magnetic sensor by directly observing and correlating the changes in velocity from GPS to the IMU sensor(s) 1366. In some examples, the IMU sensor(s) 1366 and the GNSS sensor(s) 1358 may be combined in a single integrated unit.

The vehicle may include microphone(s) 1396 placed in and/or around the vehicle 1300. The microphone(s) 1396 may be used for emergency vehicle detection and identification, among other things.

The vehicle may further include any number of camera types, including stereo camera(s) 1368, wide-view camera(s) 1370, infrared camera(s) 1372, surround camera(s) 1374, long-range and/or mid-range camera(s) 1398, and/or other camera types. The cameras may be used to capture image data around an entire periphery of the vehicle 1300. The types of cameras used depends on the embodiments and requirements for the vehicle 1300, and any combination of camera types may be used to provide the necessary coverage around the vehicle 1300. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 13A and FIG. 13B.

The vehicle 1300 may further include vibration sensor(s) 1342. The vibration sensor(s) 1342 may measure vibrations of components of the vehicle, such as the axle(s). For example, changes in vibrations may indicate a change in road surfaces. In another example, when two or more vibration sensors 1342 are used, the differences between the vibrations may be used to determine friction or slippage of the road surface (e.g., when the difference in vibration is between a power-driven axle and a freely rotating axle).

The vehicle 1300 may include an ADAS system 1338. The ADAS system 1338 may include a SoC, in some examples. The ADAS system 1338 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1360, LIDAR sensor(s) 1364, and/or a camera(s). The ACC systems may include longitudinal ACC and/or lateral ACC. Longitudinal ACC monitors and controls the distance to the vehicle immediately ahead of the vehicle 1300 and automatically adjust the vehicle speed to maintain a safe distance from vehicles ahead. Lateral ACC performs distance keeping, and advises the vehicle 1300 to change lanes when necessary. Lateral ACC is related to other ADAS applications such as LCA and CWS.

CACC uses information from other vehicles that may be received via the network interface 1324 and/or the wireless antenna(s) 1326 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1300), while the I2V communication concept provides information about traffic further ahead. CACC systems may include either or both I2V and V2V information sources. Given the information of the vehicles ahead of the vehicle 1300, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1360, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1360, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1300 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1300 if the vehicle 1300 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1360, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1300 is backing up. Some RCTW systems include AEB to ensure that the vehicle brakes are applied to avoid a crash. RCTW systems may use one or more rear-facing RADAR sensor(s) 1360, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1300, the vehicle 1300 itself must, in the case of conflicting results, decide whether to heed the result from a primary computer or a secondary computer (e.g., a first controller 1336 or a second controller 1336). For example, in some embodiments, the ADAS system 1338 may be a backup and/or secondary computer for providing perception information to a backup computer rationality module. The backup computer rationality monitor may run a redundant diverse software on hardware components to detect faults in perception and dynamic driving tasks. Outputs from the ADAS system 1338 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1304.

In other examples, ADAS system 1338 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1338 may be fed into the primary computer's perception block and/or the primary computer's dynamic driving task block. For example, if the ADAS system 1338 indicates a forward crash warning due to an object immediately ahead, the perception block may use this information when identifying objects. In other examples, the secondary computer may have its own neural network which is trained and thus reduces the risk of false positives, as described herein.

The vehicle 1300 may further include the infotainment SoC 1330 (e.g., an in-vehicle infotainment system (IVI)). Although illustrated and described as a SoC, the infotainment system may not be a SoC, and may include two or more discrete components. The infotainment SoC 1330 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1300. For example, the infotainment SoC 1330 may radios, disk players, navigation systems, video players, USB and Bluetooth connectivity, carputers, in-car entertainment, Wi-Fi, steering wheel audio controls, hands free voice control, a heads-up display (HUD), an HMI display 1334, a telematics device, a control panel (e.g., for controlling and/or interacting with various components, features, and/or systems), and/or other components. The infotainment SoC 1330 may further be used to provide information (e.g., visual and/or audible) to a user(s) of the vehicle, such as information from the ADAS system 1338, autonomous driving information such as planned vehicle maneuvers, trajectories, surrounding environment information (e.g., intersection information, vehicle information, road information, etc.), and/or other information.

The infotainment SoC 1330 may include GPU functionality. The infotainment SoC 1330 may communicate over the bus 1302 (e.g., CAN bus, Ethernet, etc.) with other devices, systems, and/or components of the vehicle 1300. In some examples, the infotainment SoC 1330 may be coupled to a supervisory MCU such that the GPU of the infotainment system may perform some self-driving functions in the event that the primary controller(s) 1336 (e.g., the primary and/or backup computers of the vehicle 1300) fail. In such an example, the infotainment SoC 1330 may put the vehicle 1300 into a chauffeur to safe stop mode, as described herein.

The vehicle 1300 may further include an instrument cluster 1332 (e.g., a digital dash, an electronic instrument cluster, a digital instrument panel, etc.). The instrument cluster 1332 may include a controller and/or supercomputer (e.g., a discrete controller or supercomputer). The instrument cluster 1332 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1330 and the instrument cluster 1332. In other words, the instrument cluster 1332 may be included as part of the infotainment SoC 1330, or vice versa.

Figure 13D:
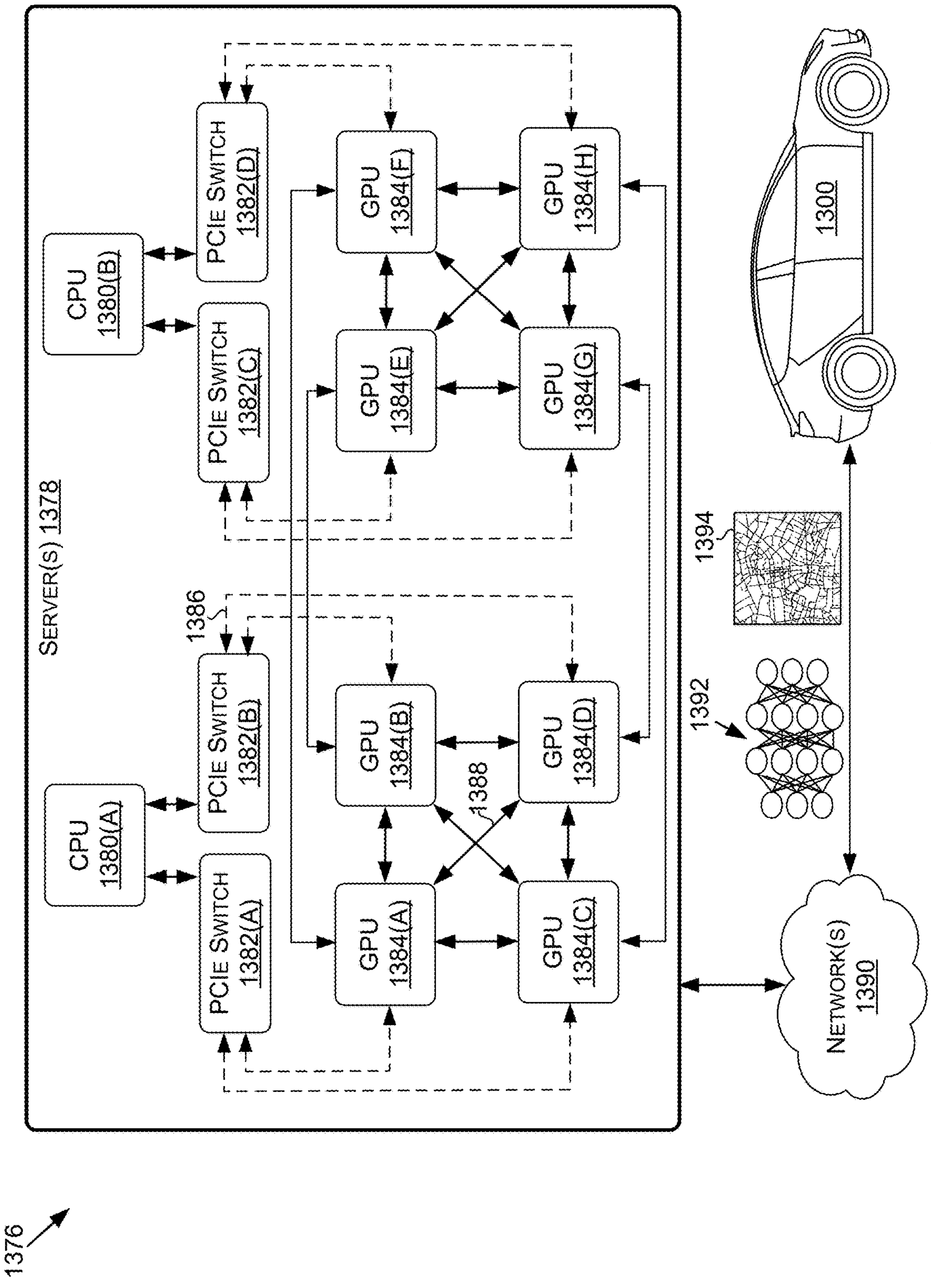
FIG. 13D is a system diagram for communication between cloud-based server(s) and the example autonomous vehicle of FIG. 13A, in accordance with some embodiments of the present disclosure.

FIG. 13D is a system diagram for communication between cloud-based server(s) and the example autonomous vehicle 1300 of FIG. 13A, in accordance with some embodiments of the present disclosure. The system 1376 may include server(s) 1378, network(s) 1390, and vehicles, including the vehicle 1300. The server(s) 1378 may include a plurality of GPUs 1384(A)-1384 (H) (collectively referred to herein as GPUs 1384), PCIe switches 1382(A)-1382(H) (collectively referred to herein as PCIe switches 1382), and/or CPUs 1380(A)-1380(B) (collectively referred to herein as CPUs 1380). The GPUs 1384, the CPUs 1380, and the PCIe switches may be interconnected with high-speed interconnects such as, for example and without limitation, NVLink interfaces 1388 developed by NVIDIA and/or PCIe connections 1386. In some examples, the GPUs 1384 are connected via NVLink and/or NVSwitch SoC and the GPUs 1384 and the PCIe switches 1382 are connected via PCIe interconnects. Although eight GPUs 1384, two CPUs 1380, and two PCIe switches are illustrated, this is not intended to be limiting. Depending on the embodiment, each of the server(s) 1378 may include any number of GPUs 1384, CPUs 1380, and/or PCIe switches. For example, the server(s) 1378 may each include eight, sixteen, thirty-two, and/or more GPUs 1384.

The server(s) 1378 may receive, over the network(s) 1390 and from the vehicles, image data representative of images showing unexpected or changed road conditions, such as recently commenced road-work. The server(s) 1378 may transmit, over the network(s) 1390 and to the vehicles, neural networks 1392, updated neural networks 1392, and/or map information 1394, including information regarding traffic and road conditions. The updates to the map information 1394 may include updates for the HD map 1322, such as information regarding construction sites, potholes, detours, flooding, and/or other obstructions. In some examples, the neural networks 1392, the updated neural networks 1392, and/or the map information 1394 may have resulted from new training and/or experiences represented in data received from any number of vehicles in the environment, and/or based on training performed at a datacenter (e.g., using the server(s) 1378 and/or other servers).

The server(s) 1378 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1390, and/or the machine learning models may be used by the server(s) 1378 to remotely monitor the vehicles.

In some examples, the server(s) 1378 may receive data from the vehicles and apply the data to up-to-date real-time neural networks for real-time intelligent inferencing. The server(s) 1378 may include deep-learning supercomputers and/or dedicated AI computers powered by GPU(s) 1384, such as a DGX and DGX Station machines developed by NVIDIA. However, in some examples, the server(s) 1378 may include deep learning infrastructure that use only CPU-powered datacenters.

The deep-learning infrastructure of the server(s) 1378 may be capable of fast, real-time inferencing, and may use that capability to evaluate and verify the health of the processors, software, and/or associated hardware in the vehicle 1300. For example, the deep-learning infrastructure may receive periodic updates from the vehicle 1300, such as a sequence of images and/or objects that the vehicle 1300 has located in that sequence of images (e.g., via computer vision and/or other machine learning object classification techniques). The deep-learning infrastructure may run its own neural network to identify the objects and compare them with the objects identified by the vehicle 1300 and, if the results do not match and the infrastructure concludes that the AI in the vehicle 1300 is malfunctioning, the server(s) 1378 may transmit a signal to the vehicle 1300 instructing a fail-safe computer of the vehicle 1300 to assume control, notify the passengers, and complete a safe parking maneuver.

For inferencing, the server(s) 1378 may include the GPU(s) 1384 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 14:
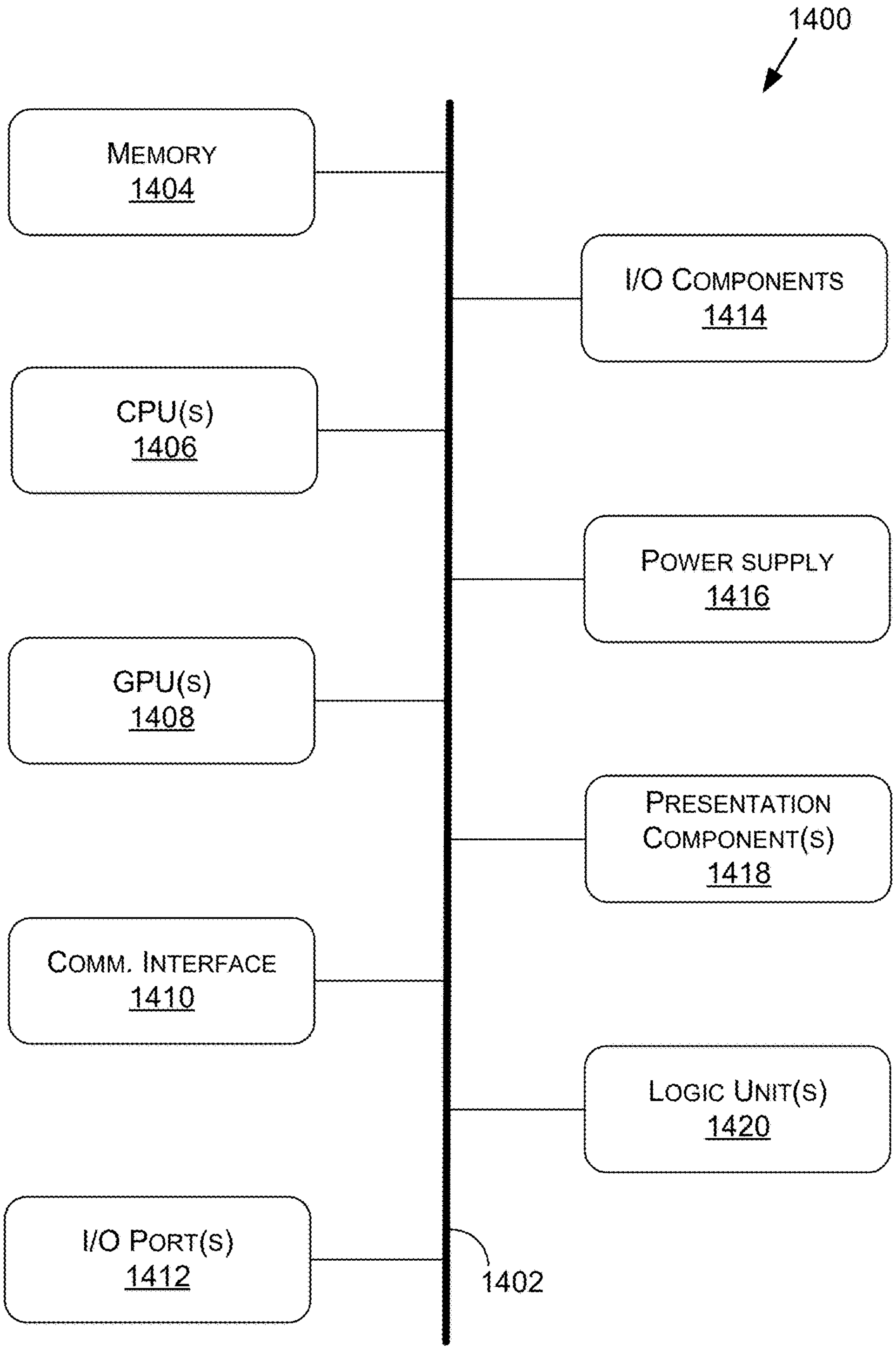
FIG. 14 is a block diagram of an example computing device suitable for use in implementing some embodiments of the present disclosure.

FIG. 14 is a block diagram of an example computing device(s) 1400 suitable for use in implementing some embodiments of the present disclosure. Computing device 1400 may include an interconnect system 1402 that directly or indirectly couples the following devices: memory 1404, one or more central processing units (CPUs) 1406, one or more graphics processing units (GPUs) 1408, a communication interface 1410, input/output (I/O) ports 1412, input/output components 1414, a power supply 1416, one or more presentation components 1418 (e.g., display(s)), and one or more logic units 1420. In at least one embodiment, the computing device(s) 1400 may comprise one or more virtual machines (VMs), and/or any of the components thereof may comprise virtual components (e.g., virtual hardware components). For non-limiting examples, one or more of the GPUs 1408 may comprise one or more vGPUs, one or more of the CPUs 1406 may comprise one or more vCPUs, and/or one or more of the logic units 1420 may comprise one or more virtual logic units. As such, a computing device(s) 1400 may include discrete components (e.g., a full GPU dedicated to the computing device 1400), virtual components (e.g., a portion of a GPU dedicated to the computing device 1400), or a combination thereof.

Although the various blocks of FIG. 14 are shown as connected via the interconnect system 1402 with lines, this is not intended to be limiting and is for clarity only. For example, in some embodiments, a presentation component 1418, such as a display device, may be considered an I/O component 1414 (e.g., if the display is a touch screen). As another example, the CPUs 1406 and/or GPUs 1408 may include memory (e.g., the memory 1404 may be representative of a storage device in addition to the memory of the GPUs 1408, the CPUs 1406, and/or other components). In other words, the computing device of FIG. 14 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 14.

The interconnect system 1402 may represent one or more links or busses, such as an address bus, a data bus, a control bus, or a combination thereof. The interconnect system 1402 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1406 may be directly connected to the memory 1404. Further, the CPU 1406 may be directly connected to the GPU 1408. Where there is direct, or point-to-point connection between components, the interconnect system 1402 may include a PCIe link to carry out the connection. In these examples, a PCI bus need not be included in the computing device 1400.

The memory 1404 may include any of a variety of computer-readable media. The computer-readable media may be any available media that may be accessed by the computing device 1400. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1404 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1400. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1406 may be configured to execute at least some of the computer-readable instructions to control one or more components of the computing device 1400 to perform one or more of the methods and/or processes described herein. The CPU(s) 1406 may each include one or more cores (e.g., one, two, four, eight, twenty-eight, seventy-two, etc.) that are capable of handling a multitude of software threads simultaneously. The CPU(s) 1406 may include any type of processor, and may include different types of processors depending on the type of computing device 1400 implemented (e.g., processors with fewer cores for mobile devices and processors with more cores for servers). For example, depending on the type of computing device 1400, the processor may be an Advanced RISC Machines (ARM) processor implemented using Reduced Instruction Set Computing (RISC) or an x86 processor implemented using Complex Instruction Set Computing (CISC). The computing device 1400 may include one or more CPUs 1406 in addition to one or more microprocessors or supplementary co-processors, such as math co-processors.

In addition to or alternatively from the CPU(s) 1406, the GPU(s) 1408 may be configured to execute at least some of the computer-readable instructions to control one or more components of the computing device 1400 to perform one or more of the methods and/or processes described herein. One or more of the GPU(s) 1408 may be an integrated GPU (e.g., with one or more of the CPU(s) 1406 and/or one or more of the GPU(s) 1408 may be a discrete GPU. In embodiments, one or more of the GPU(s) 1408 may be a coprocessor of one or more of the CPU(s) 1406. The GPU(s) 1408 may be used by the computing device 1400 to render graphics (e.g., 3D graphics) or perform general purpose computations. For example, the GPU(s) 1408 may be used for General-Purpose computing on GPUs (GPGPU). The GPU(s) 1408 may include hundreds or thousands of cores that are capable of handling hundreds or thousands of software threads simultaneously. The GPU(s) 1408 may generate pixel data for output images in response to rendering commands (e.g., rendering commands from the CPU(s) 1406 received via a host interface). The GPU(s) 1408 may include graphics memory, such as display memory, for storing pixel data or any other suitable data, such as GPGPU data. The display memory may be included as part of the memory 1404. The GPU(s) 1408 may include two or more GPUs operating in parallel (e.g., via a link). The link may directly connect the GPUs (e.g., using NVLINK) or may connect the GPUs through a switch (e.g., using NVSwitch). When combined together, each GPU 1408 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1406 and/or the GPU(s) 1408, the logic unit(s) 1420 may be configured to execute at least some of the computer-readable instructions to control one or more components of the computing device 1400 to perform one or more of the methods and/or processes described herein. In embodiments, the CPU(s) 1406, the GPU(s) 1408, and/or the logic unit(s) 1420 may discretely or jointly perform any combination of the methods, processes and/or portions thereof. One or more of the logic units 1420 may be part of and/or integrated in one or more of the CPU(s) 1406 and/or the GPU(s) 1408 and/or one or more of the logic units 1420 may be discrete components or otherwise external to the CPU(s) 1406 and/or the GPU(s) 1408. In embodiments, one or more of the logic units 1420 may be a coprocessor of one or more of the CPU(s) 1406 and/or one or more of the GPU(s) 1408.

Examples of the logic unit(s) 1420 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1410 may include one or more receivers, transmitters, and/or transceivers that enable the computing device 1400 to communicate with other computing devices via an electronic communication network, included wired and/or wireless communications. The communication interface 1410 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1420 and/or communication interface 1410 may include one or more data processing units (DPUs) to transmit data received over a network and/or through interconnect system 1402 directly to (e.g., a memory of) one or more GPU(s) 1408.

The I/O ports 1412 may enable the computing device 1400 to be logically coupled to other devices including the I/O components 1414, the presentation component(s) 1418, and/or other components, some of which may be built in to (e.g., integrated in) the computing device 1400. Illustrative I/O components 1414 include a microphone, mouse, keyboard, joystick, game pad, game controller, satellite dish, scanner, printer, wireless device, etc. The I/O components 1414 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1400. The computing device 1400 may be include depth cameras, such as stereoscopic camera systems, infrared camera systems, RGB camera systems, touchscreen technology, and combinations of these, for gesture detection and recognition. Additionally, the computing device 1400 may include accelerometers or gyroscopes (e.g., as part of an inertia measurement unit (IMU)) that enable detection of motion. In some examples, the output of the accelerometers or gyroscopes may be used by the computing device 1400 to render immersive augmented reality or virtual reality.

The power supply 1416 may include a hard-wired power supply, a battery power supply, or a combination thereof. The power supply 1416 may provide power to the computing device 1400 to enable the components of the computing device 1400 to operate.

The presentation component(s) 1418 may include a display (e.g., a monitor, a touch screen, a television screen, a heads-up-display (HUD), other display types, or a combination thereof), speakers, and/or other presentation components. The presentation component(s) 1418 may receive data from other components (e.g., the GPU(s) 1408, the CPU(s) 1406, DPUs, etc.), and output the data (e.g., as an image, video, sound, etc.).

Example Data Center

Figure 15:
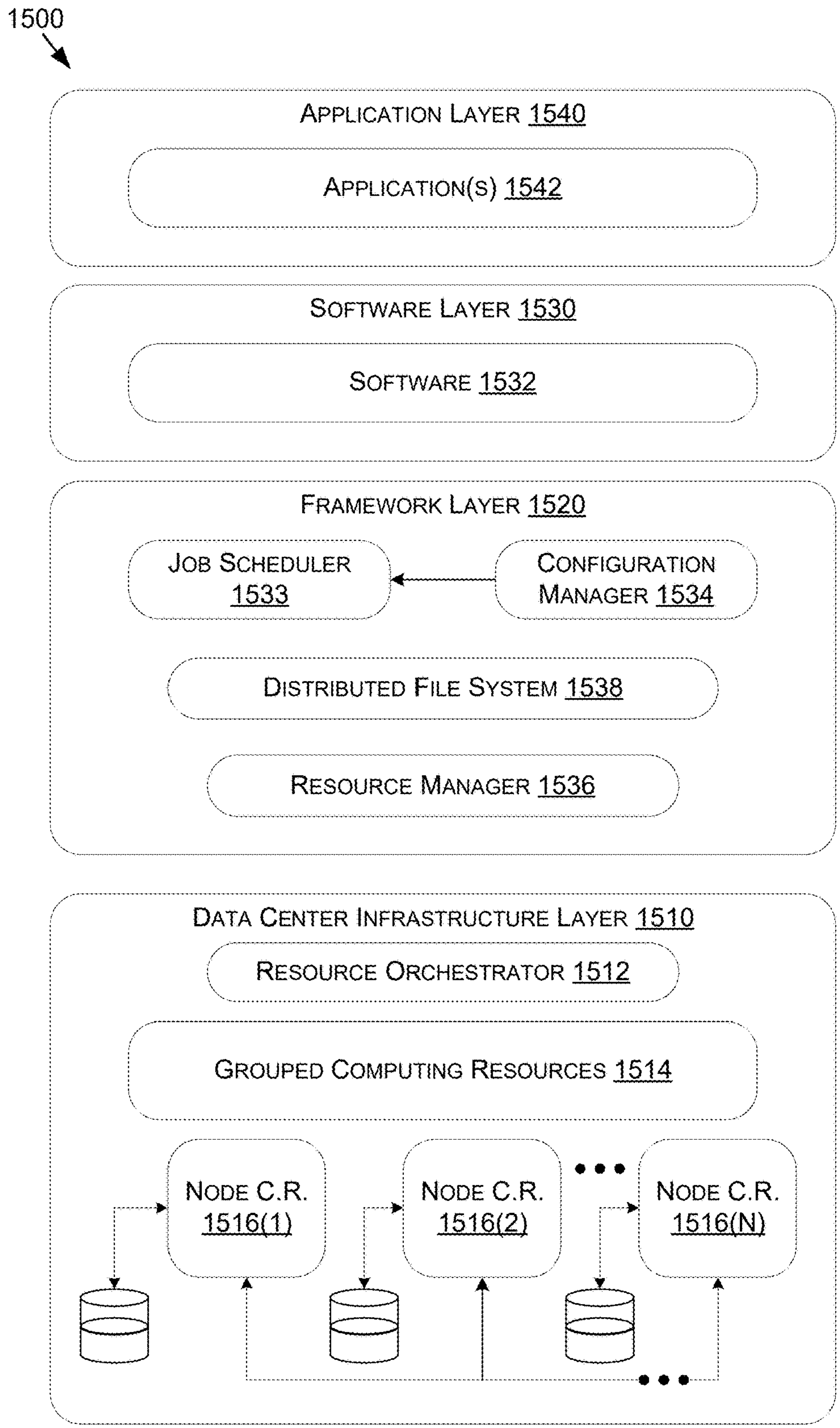
FIG. 15 is a block diagram of an example data center suitable for use in implementing some embodiments of the present disclosure.

FIG. 15 illustrates an example data center 1500 that may be used in at least one embodiments of the present disclosure. The data center 1500 may include a data center infrastructure layer 1510, a framework layer 1520, a software layer 1530, and/or an application layer 1540.

As shown in FIG. 15, the data center infrastructure layer 1510 may include a resource orchestrator 1512, grouped computing resources 1514, and node computing resources ("node C.R.s") 1516(1)-1516(N), where "N" represents any whole, positive integer. In at least one embodiment, node C.R.s 1516(1)-1516(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1516(1)-1516(N) may correspond to a server having one or more of the above-mentioned computing resources. In addition, in some embodiments, the node C.R.s 1516(1)-15161 (N) may include one or more virtual components, such as vGPUs, vCPUs, and/or the like, and/or one or more of the node C.R.s 1516(1)-1516(N) may correspond to a virtual machine (VM).

In at least one embodiment, grouped computing resources 1514 may include separate groupings of node C.R.s 1516 housed within one or more racks (not shown), or many racks housed in data centers at various geographical locations (also not shown). Separate groupings of node C.R.s 1516 within grouped computing resources 1514 may include grouped compute, network, memory or storage resources that may be configured or allocated to support one or more workloads. In at least one embodiment, several node C.R.s 1516 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1512 may configure or otherwise control one or more node C.R.s 1516(1)-1516(N) and/or grouped computing resources 1514. In at least one embodiment, resource orchestrator 1512 may include a software design infrastructure (SDI) management entity for the data center 1500. The resource orchestrator 1512 may include hardware, software, or some combination thereof.

In at least one embodiment, as shown in FIG. 15, framework layer 1520 may include a job scheduler 1533, a configuration manager 1534, a resource manager 1536, and/or a distributed file system 1538. The framework layer 1520 may include a framework to support software 1532 of software layer 1530 and/or one or more application(s) 1542 of application layer 1540. The software 1532 or application(s) 1542 may respectively include web-based service software or applications, such as those provided by Amazon Web Services, Google Cloud and Microsoft Azure. The framework layer 1520 may be, but is not limited to, a type of free and open-source software web application framework such as Apache Spark™ (hereinafter "Spark") that may utilize distributed file system 1538 for large-scale data processing (e.g., "big data"). In at least one embodiment, job scheduler 1533 may include a Spark driver to facilitate scheduling of workloads supported by various layers of data center 1500. The configuration manager 1534 may be capable of configuring different layers such as software layer 1530 and framework layer 1520 including Spark and distributed file system 1538 for supporting large-scale data processing. The resource manager 1536 may be capable of managing clustered or grouped computing resources mapped to or allocated for support of distributed file system 1538 and job scheduler 1533. In at least one embodiment, clustered or grouped computing resources may include grouped computing resource 1514 at data center infrastructure layer 1510. The resource manager 1536 may coordinate with resource orchestrator 1512 to manage these mapped or allocated computing resources.

In at least one embodiment, software 1532 included in software layer 1530 may include software used by at least portions of node C.R.s 1516(1)-1516(N), grouped computing resources 1514, and/or distributed file system 1538 of framework layer 1520. One or more types of software may include, but are not limited to, Internet web page search software, e-mail virus scan software, database software, and streaming video content software.

In at least one embodiment, application(s) 1542 included in application layer 1540 may include one or more types of applications used by at least portions of node C.R.s 1516 (1)-1516(N), grouped computing resources 1514, and/or distributed file system 1538 of framework layer 1520. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1534, resource manager 1536, and resource orchestrator 1512 may implement any number and type of self-modifying actions based on any amount and type of data acquired in any technically feasible fashion. Self-modifying actions may relieve a data center operator of data center 1500 from making possibly bad configuration decisions and possibly avoiding underutilized and/or poor performing portions of a data center.

The data center 1500 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1500. In at least one embodiment, trained or deployed machine learning models corresponding to one or more neural networks may be used to infer or predict information using resources described above with respect to the data center 1500 by using weight parameters calculated through one or more training techniques, such as but not limited to those described herein.

In at least one embodiment, the data center 1500 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1400 of FIG. 14—e.g., each device may include similar components, features, and/or functionality of the computing device(s) 1400. In addition, where backend devices (e.g., servers, NAS, etc.) are implemented, the backend devices may be included as part of a data center 1500, an example of which is described in more detail herein with respect to FIG. 15.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., “big data”).

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1400 described herein with respect to FIG. 14. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types.

The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

EXAMPLE PARAGRAPHS

A: A method comprising: obtaining first data associated with one or more image sensors and second data associated with one or more RADAR sensors, the second data representative of at least one or more points; determining, based at least on the first data, one or more locations associated with one or more landmarks located within an environment; determining, based at least on the one or more locations, that at least a portion of the one or more points are associated with the one or more landmarks; updating, based at least on the at least the portion of the one or more points being associated with the one or more landmarks, a camera-based map to indicate the one or more locations associated with the one or more landmarks and one or more indications that the one or more landmarks are associated with RADAR reflections; and sending third data representative of the camera-based map to one or more machines for use in navigating within the environment.

B: The method of paragraph A, further comprising: determining, based at least on the first data, one or more second locations associated with one or more second landmarks located within the environment; determining that the one or more points are not associated with the one or more second landmarks; and further updating, based at least on the one or more points not being associated with the one or more second landmarks, the camera-based map to indicate the one or more second locations associated with the one or more second landmarks and one or more second indications that the one or more second landmarks are not associated with RADAR reflections.

C: The method of either paragraph A or paragraph B, further comprising one or more of: determining a synchronization between the first data and the second data based at least on one or more first timestamps associated with the first data and one or more second timestamps associated with the second data; or determining an alignment between the first data and the second data based at least on transforming the one or more images and the one or more points into a common coordinate system.

D: The method of any one of paragraphs A-C, wherein the determining that the at least the portion of the one or more points are associated with the one or more landmarks comprises: determining, based at least on the one or more locations, one or more areas within the environment that are associated with the one or more landmarks; determining, based at least on the second data, one or more three-dimensional (3D) locations associated with the one or more points within the environment; and determining that at least a portion of the one or more 3D locations correspond to the one or more areas.

E: The method of any one of paragraph A-D, wherein the determining that at least the portion of the one or more points are associated with the one or more landmarks comprises: determining, based at least on the one or more locations, one or more two-dimensional (2D) areas associated with one or more images represented by the first data; projecting one or more three-dimensional (3D) locations associated with the one or more points to one or more 2D points associated with the one or more images; and determining that at least a portion of the one or more 2D points correspond to the one or more 2D areas.

F: The method of any one of paragraphs A-E, further comprising: determining, based at least on one or more numbers of the one or more points that are associated with the one or more landmarks, one or more weights associated with the one or more landmarks; and further updating the camera-based map to indicate the one or more weights associated with the one or more landmarks.

G: A system comprising: one or more processors to: determine, based at least on first data associated with a first type of sensor, one or more locations associated with one or more landmarks located within an environment; update a map to indicate the one or more locations associated with the one or more landmarks; determine, based at least on the one or more locations and second data associated with a second type of sensor, that at least a portion of one or more points represented by the second data are associated with the one or more landmarks; and update, based at least the at least the portion of the one or more points being associated with the one or more landmarks, the map to include one or more indications that the one or more landmarks are associated with the second type of sensor.

H: The system of paragraph G, wherein the one or more processors are further to: determine, based at least on the first data, one or more second locations associated with one or more second landmarks located within the environment; update the map to indicate the one or more second locations of the one or more second landmarks; determine, based at least on the one or more second locations and the second data, that the one or more points are not associated with the one or more second landmarks; and update, based at least the one or more points not being associated with the one or more second landmarks, the map to include one or more second indications that the one or more second landmarks are not associated with the second type of sensor.

I: The system of either paragraph G or paragraph H, wherein the one or more processors are further to: determine a synchronization between the first data and the second data based at least on one or more first timestamps associated with the first data and one or more second timestamps associated with the second data, wherein the determination that the at least the portion of the one or more points are associated with the one or more landmarks is further based at least on the synchronization.

J: The system of any one of paragraph G-I, wherein the one or more processors are further to: determine an alignment between the first data and the second data based at least on transforming one or more images represented by the first data and the one or more points into a common coordinate system, wherein the determination that the at least the portion of the one or more points are associated with the one or more landmarks is further based at least on the alignment.

K: The system of any one of paragraphs G-J, wherein the determination that the at least the portion of the one or more points are associated with the one or more landmarks comprises: determining, based at least on the one or more locations, one or more areas within the environment that are associated with the one or more landmarks; determining, based at least on the second data, one or more three-dimensional (3D) locations associated with the one or more points; and determining that at least a portion of the one or more 3D locations correspond to the one or more areas.

L: The system of paragraph K, wherein the one or more processors are further to: determine one or more uncertainties associated with the one or more locations, wherein the determining the one or more areas within the environment that are associated with the one or more landmarks is further based at least on the one or more uncertainties.

M: The system of any one of paragraphs G-L, wherein the determination that at least the portion of the one or more points are associated with the one or more landmarks comprises: determining, based at least on the one or more locations, one or more two-dimensional (2D) areas associated with one or more images represented by the first data; projecting one or more three-dimensional (3D) locations associated with the one or more points to one or more 2D points associated with the one or more images; and determining that at least a portion of the one or more 2D points correspond to the one or more 2D areas.

N: The system of any one of paragraphs G-M, wherein the one or more processors are further to: determine, based at least on one or more numbers of the one or more points that are associated with the one or more landmarks, one or more weights associated with the one or more landmarks; and update the map to include one or more second indications of the one or more weights associated with the one or more landmarks.

O: The system of any one of paragraphs G-N, wherein the one or more processors are further to send, to one or more machines navigating within the environment, data representative of the map.

P: The system of any one of paragraphs G-O, wherein: the first type of sensor includes an image sensor; the second type of sensor includes at least one of: a RADAR sensor; a LiDAR sensor; an ultrasonic sensor; or a sonar sensor.

Q: The system of any one of paragraphs G-P, wherein the one or more processors are further to: determine, based at least on the first data, one or more classifications associated with the one or more landmarks; and update the map to include one or more second indications of the one or more classifications.

R: The system of any one of paragraphs G-Q, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system that provides one or more cloud gaming applications; a system for performing one or more deep learning operations; a system implemented using an edge device; a system implemented using a robot; a system for performing one or more generative AI operations; a system for performing operations using one or more large language models (LLMs); a system for performing operations using one or more vision language models (VLMs); a system for performing operations using one or more multi-modal language models; a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

S: One or more processors comprising: processing circuitry to update a camera-based map to indicate one or more locations associated with one or more landmarks within an environment and one or more indications that the one or more landmarks are associated with sensor reflections, wherein the one or more landmarks are determined to be associated with the sensor reflections based at least on one or more points represented by RADAR data being associated with the one or more landmarks.

T: The one or more processors of paragraph S, wherein the one or more processors are comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system that provides one or more cloud gaming applications; a system for performing one or more deep learning operations; a system implemented using an edge device; a system implemented using a robot; a system for performing one or more generative AI operations; a system for performing operations using one or more large language models (LLMs); a system for performing operations using one or more vision language models (VLMs); a system for performing operations using one or more multi-modal language models; a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

U: A method comprising: determining, based at least on a camera-based map associated with an environment, one or more locations associated with one or more landmarks located within the environment; determining, based at least on the camera-based map, that the one or more landmarks are associated with RADAR reflections; localizing, based at least on the one or more landmarks being associated with the RADAR reflections, a machine within the environment by at least aligning one or more points represented by RADAR data with the one or more locations associated with the one or more landmarks; and causing the machine to perform one or more operations based at least on the localizing.

V: The method of paragraph U, further comprising: determining, based at least on the one or more locations, one or more areas that at least partially surround the one or more landmarks, wherein the localizing of the machine is by at least aligning the one or more points with the one or more areas.

W: The method of paragraph V, wherein the one or more areas that at least partially surround the one or more landmarks include at least: one or more first areas that at least partially surround the one or more landmarks using one or more first distances; and one or more second areas that at least partially surround the one or more landmarks using one or more second distances.

X: The method of any one of paragraphs U-W, wherein the localizing the machine within the environment comprises: determining, based at least on the aligning, one or more costs based at least on one or more distances between the one or more points and the one or more locations; and localizing the machine within the environment based at least on the one or more costs.

Y: The method of any one or paragraphs U-X, wherein the localizing the machine within the environment comprises: determining, for a first pose within the environment and based at least on the aligning, one or more first costs based at least on one or more first distances between the one or more points and the one or more locations; determining, for a second pose within the environment and based at least on the aligning, one or more second costs based at least on one or more second distances between the one or more points and the one or more locations; and localizing the machine within the environment based at least on the one or more first costs and the one or more second costs.

Z: The method of paragraph Y, wherein the localizing the machine within the environment comprises: determining that the one or more second costs is less than the one or more first costs; and determining that the machine includes the second pose within the environment based at least on the one or more second costs being less than the one or more first costs.

AA: The method of any one of paragraphs U-Z, further comprising: determining, based at least on image data obtained from the machine, one or more second locations associated with the one or more landmarks; and analyzing the one or more second locations associated with the one or more landmarks with respect to the one or more locations associated with the one or more landmarks, wherein the localizing the machine within the environment is further based at least on the analyzing the one or more second locations with respect to the one or more locations.

AB: A system comprising: one or more processors to: determine, based at least on a map that is associated with a first type of sensor, one or more first locations associated with one or more landmarks located within an environment; determine, based at least on the map, that the one or more landmarks are associated with a second type of sensor; determine, based at least on the one or more landmarks being associated with the second type of sensor, a second location associated with a machine within the environment using at least the one or more first locations associated with the one or more landmarks and one or more points represented by sensor data that is associated with the second type of sensor; and cause the machine to perform one or more operations based at least on the second location.

AC: The system of paragraph AB, wherein the map indicates at least: the one or more locations associated with the one or more landmarks as determined using first data associated with the first type of sensor; one or more classifications associated with the one or more landmarks as determined using the first data; and that the one or more landmarks are associated with the second type of sensor as determined using second data associated with the second type of sensor.

AD: The system of either paragraph AB or paragraph AC, wherein the one or more processors are further to: determine, based at least on the map, one or more third locations associated with one or more second landmarks located within the environment; and determine, based at least on the map, that the one or more second landmarks are not associated with the second type of sensor, wherein the determination of the second location associated with the machine does not analyze the one or more second landmarks with respect to the one or more points based at least on the one or more second landmarks not being associated with the second type of sensor.

AE: The system of any one of paragraphs AB-AD, wherein the one or more processors are further to: determine, based at least on the one or more first locations, one or more areas that at least partially surround the one or more landmarks, wherein the determination of the second location associated with the machine uses the one or more points and the one or more areas.

AF: The system of paragraph AE, wherein the one or more areas that at least partially surround the one or more landmarks include at least: one or more first areas that at least partially surround the one or more landmarks by one or more first distances; and one or more second areas that at least partially surround the one or more landmarks by one or more second distances.

AG: The system of any one of paragraphs AB-AF, wherein the determination of the second location associated with the machine comprises: determining one or more costs based at least on one or more distances between the one or more points and the one or more first locations; and determining the second location associated with the machine based at least on the one or more costs.

AH: The system of any one of paragraphs AB-AG, wherein the determination of the second location associated with the machine comprises: determining, for the second location within the environment, one or more first costs based at least on one or more first distances between the one or more points and the one or more first locations; determining, for a third location within the environment, one or more second costs based at least on one or more second distances between the one or more points and the one or more first locations; and determining the second location associated with the machine based at least on the one or more first costs and the one or more second costs.

AI: The system of paragraph AH, wherein the determination of the second location associated with the machine comprises: determining that the one or more first costs are less than the one or more second costs; and determining that the machine is located at the second location within the environment based at least on the one or more first costs being less than the one or more second costs.

AJ: The system of any one of paragraphs AB-AI, wherein the one or more processors are further to: determine, based at least on second sensor data associated with the first type of sensor, one or more third locations associated with the one or more landmarks, wherein the determination of the second location associated with the machine further uses the one or more third locations associated with the one or more landmarks.

AK: The system of any one of paragraphs AB-AJ, wherein the one or more processors are further to: determine, based at least on the map, one or more weights associated with the one or more landmarks; and determine, based at least on the sensor data, one or more numbers of points associated with the one or more landmarks, wherein the determination of the second location associated with the machine further uses the one or more weights and the one or more numbers of points.

AL: The system of any one of paragraphs AB-AK, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system that provides one or more cloud gaming applications; a system for performing one or more deep learning operations; a system implemented using an edge device; a system implemented using a robot; a system for performing one or more generative AI operations; a system for performing operations using one or more large language models (LLMs); a system for performing operations using one or more vision language models (VLMs); a system for performing operations using one or more multi-modal language models; a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

AM: One or more processors comprising: processing circuitry to localize a machine within an environment using one or more locations associated with one or more landmarks from a map and one or more indications that the one or more landmarks are associated with sensor reflections, wherein the localization of the machine is based at least on analyzing one or more points represented by sensor data with the one or more locations based at least on the one or more locations being associated with the sensor reflections.

AN: The one or more processors of paragraph AM, wherein the one or more processors are comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system that provides one or more cloud gaming applications; a system for performing one or more deep learning operations; a system implemented using an edge device; a system implemented using a robot; a system for performing one or more generative AI operations; a system for performing operations using one or more large language models (LLMs); a system for performing operations using one or more vision language models (VLMs); a system for performing operations using one or more multi-modal language models; a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

What is claimed is:

1. A method comprising:

causing a first machine to navigate within an environment based at least on a camera-based map representative of at least a portion of the environment, wherein the camera-based map is updated, at least, by:

obtaining first data associated with one or more image sensors of a second machine and second data associated with one or more RADAR sensors of the second machine, the second data representative of at least one or more RADAR points;

updating the camera-based map to indicate one or more locations associated with one or more landmarks within the environment as represented by the first data;

projecting one or more three-dimensional (3D) locations of the one or more RADAR points to one or more two-dimensional (2D) points on one or more images represented by the first data;

determining, based at least on the one or more 2D points being within one or more 2D areas of the one or more images that represent the one or more landmarks, that the one or more RADAR points reflected off the one or more landmarks within the environment; and updating, based at least on the one or more RADAR points reflecting off the one or more landmarks, the camera-based map to include one or more indications that the one or more landmarks are associated with RADAR reflections.

2. The method of claim 1, wherein the camera-based map is further updated by:

determining that the first data represents one or more second locations associated with one or more second landmarks located within the environment;

determining that the one or more RADAR points did not reflect off the one or more second landmarks; and updating, based at least on the one or more RADAR points not reflecting off the one or more second landmarks, the camera-based map to indicate the one or more second locations associated with the one or more second landmarks and to include one or more second indications that the one or more second landmarks are not associated with RADAR reflections.

3. The method of claim 1, wherein the camera-based map is further updated by one or more of:

determining a synchronization between the first data and the second data based at least on one or more first timestamps associated with the first data and one or more second timestamps associated with the second data; or determining an alignment between the first data and the second data based at least on transforming the one or more images and the one or more RADAR points into a common coordinate system.

4. The method of claim 1, wherein the camera-based map is further updated by:

determining, based at least on one or more second locations associated with one or more second landmarks, one or more second areas within the environment that are associated with the one or more second landmarks;

determining one or more second 3D locations associated with one or more second RADAR points within the environment;

determining that the one or more second 3D locations correspond to the one or more second areas; and updating the camera-based map to include one or more second indications that the one or more second landmarks are associated with RADAR reflections.

5. The method of claim 1, wherein the camera-based map is further updated by:

determining, based at least on one or more second locations associated with one or more second landmarks, one or more second 2D areas on one or more images represented by the first data;

projecting one or more second 3D locations associated with one or more second RADAR points to one or more second 2D points associated with the one or more images;

determining that the one or more second 2D points are outside of the one or more 2D areas; and refraining from updating the camera-based map to include one or more second indications that the one or more second landmarks are associated with RADAR reflections.

6. The method of claim 1, wherein the camera-based map is further updated by:

determining, based at least on one or more numbers of the one or more RADAR points that are associated with the one or more landmarks, one or more weights associated with the one or more landmarks; and updating the camera-based map to indicate the one or more weights associated with the one or more landmarks.

7. A system comprising:

one or more processors to cause a first machine to navigate within an environment based at least on a map representing at least a portion of the environment, wherein the map is updated, at least, by:

obtaining first data associated with a first type of sensor of a second machine within the environment and second data associated with a second type of sensor of the second machine, the second data representative of one or more points within the environment;

updating the map to indicate one or more locations associated with one or more landmarks represented by the first data;

determining, based at least on the one or more locations as represented by the first data, one or more areas located within the environment that are associated with the one or more landmarks;

determining, based at least on one or more three-dimensional (3D) locations of the one or more points corresponding to the one or more areas associated with the one or more landmarks, that the one or more points are associated with the one or more landmarks; and updating, based at least the one or more points being associated with the one or more landmarks, the map to include one or more indications that the one or more landmarks are associated with reflections corresponding to the second type of sensor.

8. The system of claim 7, wherein the map is further updated by:

updating the map to indicate one or more second locations associated with one or more second landmarks represented by the first data;

determining that the second data does not represent one or more second points associated with the one or more second landmarks; and updating, based at least the second data not representing the one or more second points associated with the one or more second landmarks, the map to include one or more second indications that the one or more second landmarks are not associated with reflections corresponding to the second type of sensor.

9. The system of claim 7, wherein the map is further updated by:

determining a synchronization between the first data and the second data based at least on one or more first timestamps associated with the first data and one or more second timestamps associated with the second data, wherein the determining that the one or more points are associated with the one or more landmarks is further based at least on the synchronization.

10. The system of claim 7, wherein the map is further updated by:

determining an alignment between the first data and the second data based at least on transforming one or more images represented by the first data and the one or more points into a common coordinate system, wherein the determining that the one or more points are associated with the one or more landmarks is further based at least on the alignment.

11. The system of claim 7, wherein the map is further updated by:

determining, based at least on one or more locations associated with one or more second landmarks, one or more second areas located within the environment that are associated with the one or more second landmarks;

determining, based at least on the second data, one or more second 3D locations associated with one or more second points;

determining that the one or more second 3D locations do not correspond to the one or more areas; and updating the map to one or more second indications that the one or more second landmarks are not associated with reflections corresponding to the second type of sensor.

12. The system of claim 7, wherein the map is further updated by:

determining one or more uncertainties associated with the one or more locations, wherein the determining the one or more areas located within the environment that are associated with the one or more landmarks is further based at least on the one or more uncertainties.

13. The system of claim 7, wherein the map is further updated by:

determining, based at least on one or more second locations associated with one or more second landmarks, one or more two-dimensional (2D) areas associated with one or more images represented by the first data;

projecting one or more second 3D locations associated with one or more second points to one or more 2D points associated with the one or more images;

determining that the one or more 2D points correspond to the one or more 2D areas; and updating the map to include one or more second indications that the one or more second landmarks are associated with reflections corresponding to the second type of sensor.

14. The system of claim 7, wherein the map is further updated by:

determining, based at least on one or more numbers of the one or more points that are associated with the one or more landmarks, one or more weights associated with the one or more landmarks; and updating the map to include one or more second indications of the one or more weights associated with the one or more landmarks.

15. The system of claim 7, wherein the one or more processors are further to receive, from one or more computing devices, data representative of the map.

16. The system of claim 7, wherein:

the first type of sensor includes an image sensor;

the second type of sensor includes at least one of:

a RADAR sensor;

a LiDAR sensor;

an ultrasonic sensor; or a sonar sensor.

17. The system of claim 7, wherein the map does not include the one or more points represented by the second data.

18. The system of claim 7, wherein the system is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system that provides one or more cloud gaming applications;

a system for performing one or more deep learning operations;

a system implemented using an edge device;

a system implemented using a robot;

a system for performing one or more generative AI operations;

a system for performing operations using one or more large language models (LLMs);

a system for performing operations using one or more vision language models (VLMs);

a system for performing operations using one or more multi-modal language models;

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

19. One or more processors comprising:

processing circuitry to cause a first machine to navigate within an environment based at least on a map representing at least a portion of the environment, wherein the map is updated by:

receiving image data obtained using one or more image sensors of a second machine and RADAR data obtained using one or more RADAR sensors of the second machine, the image data representative of one or more images;

determining, based at least on one or more two-dimensional (2D) areas of one or more images that are associated with one or more landmarks, one or more first three-dimensional (3D) locations associated with the one or more landmarks located within an environment;

determining, based at least on projecting one or more second 3D locations associated with one or more RADAR points represented by the RADAR data, one or more 2D points associated with the one or more images;

determining, based at least on analyzing the one or more 2D points with respect to the one or more 2D areas of the one or more images, that the one or more RADAR points are associated with the one or more landmarks; and update based at least on the one or more RADAR points being associated with the one or more landmarks, a map to indicate the one or more first 3D locations and information indicating that the one or more landmarks are associated with RADAR reflections.

20. The one or more processors of claim 19, wherein the one or more processors are comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system that provides one or more cloud gaming applications;

a system for performing one or more deep learning operations;

a system implemented using an edge device;

a system implemented using a robot;

a system for performing one or more generative AI operations;

a system for performing operations using one or more large language models (LLMs);

a system for performing operations using one or more vision language models (VLMs);

a system for performing operations using one or more multi-modal language models;

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

* * * * *